(12) United States Patent
Hattori et al.

(10) Patent No.: US 7,949,469 B2
(45) Date of Patent: May 24, 2011

(54) OBSTACLE AVOIDANCE CONTROL DEVICE AND RECORDING MEDIUM

(75) Inventors: Yoshikazu Hattori, Nisshin (JP); Eiichi Ono, Toyota (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 753 days.

(21) Appl. No.: 11/917,429

(22) PCT Filed: Jun. 13, 2006

(86) PCT No.: PCT/JP2006/311861
§ 371 (c)(1),
(2), (4) Date: Dec. 13, 2007

(87) PCT Pub. No.: WO2006/134934
PCT Pub. Date: Dec. 21, 2006

(65) Prior Publication Data
US 2010/0217527 A1    Aug. 26, 2010

(30) Foreign Application Priority Data

Jun. 13, 2005   (JP) .................................. 2005-172933

(51) Int. Cl.
*G08G 1/16* (2006.01)
(52) U.S. Cl. ............ 701/301; 701/1; 701/300; 340/436; 340/903
(58) Field of Classification Search .................. 701/301, 701/1, 300; 340/903, 904, 435, 436
See application file for complete search history.

(56) References Cited

U.S. PATENT DOCUMENTS

| | | | | |
|---|---|---|---|---|
| 5,699,040 | A | * | 12/1997 | Matsuda ........................ 340/435 |
| 7,038,577 | B2 | * | 5/2006 | Pawlicki et al. .............. 340/435 |
| 7,136,750 | B2 | * | 11/2006 | Takahama et al. ............ 701/213 |

FOREIGN PATENT DOCUMENTS

| | | |
|---|---|---|
| JP | 7-209418 | 8/1995 |
| JP | 9-323628 | 12/1997 |
| JP | 10-205366 | 8/1998 |
| JP | 2000-67396 | 3/2000 |
| JP | 2000-128007 | 5/2000 |
| JP | 2001-191815 | 7/2001 |
| JP | 2002-274344 | 9/2002 |
| JP | 2003-132498 | 5/2003 |
| JP | 2003-232853 | 8/2003 |
| JP | 2003-315452 | 11/2003 |
| JP | 2003-327018 | 11/2003 |
| JP | 2005-132172 | 5/2005 |
| JP | 2005-254835 | 9/2005 |

* cited by examiner

*Primary Examiner* — Thomas G Black
*Assistant Examiner* — Marthe Marc Coleman
(74) *Attorney, Agent, or Firm* — Oblon, Spivak, McClelland, Maier & Neustadt, L.L.P.

(57) ABSTRACT

An obstacle avoidance control device has a detector for detecting the distance between a vehicle and an obstacle and the relative speed of the vehicle with respect to the obstacle, a memory for storing a map for calculating vehicle generation force to avoid the obstacle based on a parameter set by a physical quantity determined by a component $V_x$ in the vehicle front-rear direction as of the relative speed, a component $V_y$ in the vehicle lateral direction of the relative speed, and a distance $Y_e'$ in the vehicle lateral direction, for avoiding the obstacle, and a computing unit for computing the parameter based on the distance and the relative speed that are detected by the detector and computing vehicle generation force by using the calculated parameter and the map.

13 Claims, 19 Drawing Sheets

FIG. 10
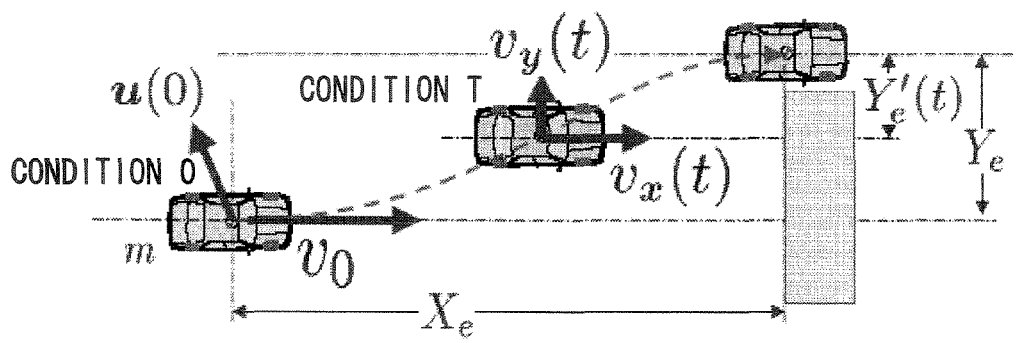
FIG. 11
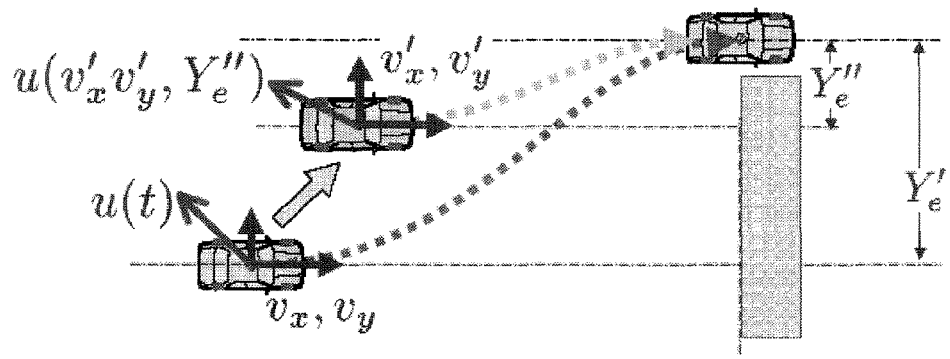
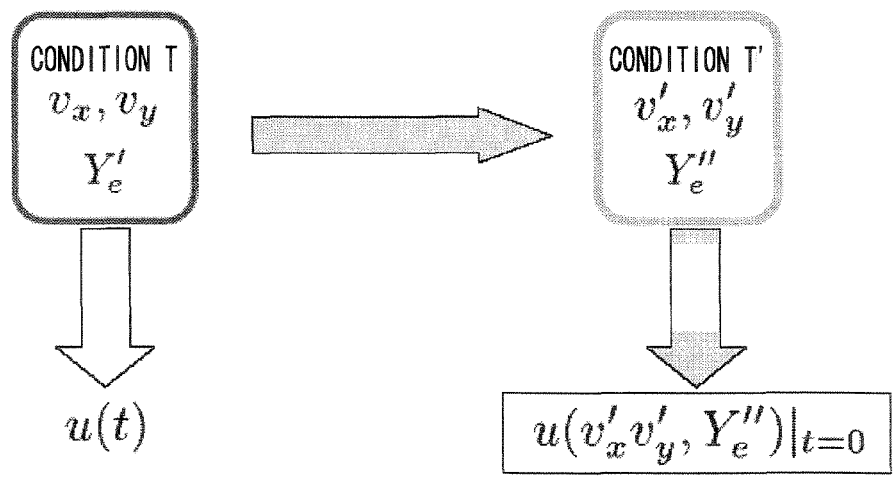

$$v_x(t) \quad v_y(t) \quad Y'_e(t)$$

⇓

$$v_y/\sqrt{Y'_e} \quad \sqrt{Y'_e}/v_x$$

$$\theta(t/T_e)$$

$$u_x(t) = \sin(\theta(t))$$
$$u_y(t) = \cos(\theta(t))$$

$$u_x(t), u_y(t)$$

OBSTACLE AVOIDANCE CONTROL DEVICE AND RECORDING MEDIUM

TECHNICAL FIELD

The present invention relates to an obstacle avoidance control device and a recording medium in which an obstacle avoidance control program is recorded and more particularly to an obstacle avoidance control device for computing vehicle resultant force to avoid the obstacle and a recording medium in which the obstacle avoidance control program is recorded.

BACKGROUND ART

To obtain an optimum operation which should be performed currently when information about the front direction of a vehicle such as the position of an obstacle and road width is an important art which leads to next generation safety system and automatic driving. However, because tire force has a non-linear saturation characteristic, it is not easy to obtain a tire force (optimum control strategy) which achieves optimum traveling trajectory in a certain time interval.

Conventionally, a control device which computes a degree of risk based on TIC (time to collision) and controls the vehicle based on the degree of risk has been known (patent document 1). Further, another control device which controls the vehicle based on a distance between an obstacle and the vehicle and a necessary deceleration distance has been known (patent document 2).

Further, it has been known to obtain an optimum control strategy using a dynamic programming (DP) or mathematical programming method for a shortest avoidance problem to a simple mass system.

Further, a method of computing an optimum control strategy corresponding to a vehicle speed and an avoidance distance at the time of starting the avoiding operation by extracting features of the optimum control strategy obtained by online computation by feed forward way has been known.

Patent document 1: Japanese Patent Application Laid-Open No. 2003-32018
Patent document 2: Japanese Patent Application Laid-Open No. 2002-274344

DISCLOSURE OF THE INVENTION

Problem to be Solved by the Invention

However, whether or not the avoidance is enabled by straight line braking serves as a criterion in the conventional art. Thus, even if the avoidance is enabled by only steering without braking, sometimes the braking force is controlled so as to produce a feeling of erroneous operation. According to a specific control method, tradeoff between avoidance performance and safety is carried out only qualitatively and a control which enables the avoidance over the shortest distance is not carried out. Further considering correspondence to a case where an obstacle which is an avoiding object is moved or a variety of robustness to disturbance, conditions of the vehicle and obstacle need to be controlled by feedback. However, the conventional art has not considered the feedback control of the conditions of the vehicle and obstacle.

The invention has been proposed to solve the above-described problems.

Means for Solving the Problem

The present invention is constructed to include: a detector for detecting a distance between a vehicle and an obstacle and a relative speed of the vehicle with respect to the obstacle; a memory which stores a map for computing a vehicle resultant force for avoiding the obstacle based on a parameter specified by physical quantity determined based on a component $v_x$ in the vehicle longitudinal direction of the relative speed, a component $v_y$ in a vehicle lateral direction of the relative speed and a vehicle lateral direction distance $Y_e'$ for avoiding the obstacle; and a computing unit for computing the parameter based on the distance and the relative speed detected by the detector and the vehicle resultant force using the computed parameter and the map.

According to the invention, the memory stores a map for computing a vehicle resultant force for avoiding the obstacle based on a first parameter specified by physical quantity determined based on a component $v_x$ in a vehicle longitudinal direction of the relative speed and a vehicle lateral direction distance $Y_e'$ for avoiding the obstacle and a second parameter specified by physical quantity determined based on a component $v_y$ in the vehicle lateral direction of the relative speed and a vehicle lateral direction distance $Y_e'$ for avoiding the obstacle. The computing unit may be so constructed to compute the first parameter and the second parameter based on the distance detected by the detector and the relative speed and compute the vehicle resultant force using the computed first parameter and second parameter and the map.

The invention may notify a vehicle driver of an obstacle avoidance condition based on the vehicle resultant force computed by the computing unit and control at least one of steering angle, braking force and driving force based on the vehicle resultant force computed by the computing unit.

An alarm may be dispatched when the distance is longer by a predetermined distance than the shorter distance of the shortest avoidance distance by the straight line braking and the shortest avoidance distance by only the lateral movement.

The first parameter of the invention may be determined by a ratio $(v_x/\sqrt{(Y_e')}$ or $\sqrt{(Y_e')}/v_x)$ between the component $v_x$ in the vehicle longitudinal direction of the relative speed and a square root of the vehicle lateral direction distance $Y_e'$ for avoiding the obstacle or a ratio $(v_x/T_{min}$ or $T_{max}/v_x)$ between the component $v_x$ in the vehicle longitudinal direction of the relative speed and a time $T_{min}$ required for traveling over a vehicle lateral direction distance $Y_e'$ for avoiding the obstacle. The second parameter may be determined by a ratio $(v_y/\sqrt{(Y_e')}$ or $\sqrt{(Y_e')}/v_y)$ between the component $v_y$ of the vehicle lateral direction of the relative speed and a square root of the vehicle lateral direction distance $Y_e'$ for avoiding the obstacle or ratio $(v_y/T_{min}$ or $T_{min}/v_y)$ between the component $v_y$ in the vehicle lateral direction of the relative speed and a time $T_{min}$ required for traveling over the vehicle lateral direction distance $Y_e'$ for avoiding the obstacle.

In the invention, preferably, the first parameter is determined by the ratio $(\sqrt{(Y_e')}/v_x)$ of the square root of the vehicle lateral direction distance $Y_e'$ for avoiding the obstacle with respect to the component $v_x$ in the vehicle longitudinal direction of the relative speed and the second parameter is determined by the ratio $(v_y/\sqrt{(Y_e')})$ between the component $v_y$ in the vehicle lateral direction of the relative speed with respect to the square root of the vehicle lateral direction distance $Y_e'$ for avoiding the obstacle.

Further, the map may comprise a map which specifies the relationship among the first parameter, the second parameter and the vehicle resultant force.

The map may comprise a first map which specifies a relationship of the first initial parameter specified by the first parameter, the second parameter and the physical quantity determined based on the initial value $v_0$ in the vehicle longitudinal direction of the relative speed and the initial value $Y_e$ of the vehicle lateral direction distance for avoiding the obstacle, a second map which specifies a relationship of the second initial parameter specified by the first parameter, the second parameter and the physical quantity (for example, $t/T_e$) determined based on the initial avoidance time $T_e$ and current time t and a third map which specifies the relationship of the first initial parameter, the second initial parameter and the vehicle resultant force.

The limit value of the tire force of each wheel under a limit traveling condition of the vehicle is obtained by a radius of a friction circle estimated based on the self aligning torque (SAT) of a wheel and wheel speed movement. The magnitude of the vehicle resultant force is always maximized. Therefore, the front-rear force and lateral force are automatically determined when the direction θ of the vehicle resultant force is determined. Thus, in the invention, the vehicle resultant force may be regarded as the direction θ of the vehicle resultant force. Further, because the direction and magnitude of the vehicle resultant force need to be determined under the limit traveling condition of the vehicle, the vehicle resultant force may be regarded as the direction θ and the magnitude.

EFFECT OF THE INVENTION

As described above, according to the present invention, there is obtained an effect that a vehicle resultant force capable of avoiding an obstacle over a shortest distance may be computed.

BRIEF DESCRIPTION OF THE INVENTION

FIG. 10 is a diagram showing a vehicle condition in conditions $t(v_x(t), v_y(t)), Y_e'(t))$ with condition 0 as a beginning point.

FIG. 11 is a diagram showing a condition for obtaining new optimum control strategy $(u(v_x', v_y', Y_e''))$ by feeding back a condition t' produced when condition t departs from optimum avoidance.

BEST MODE FOR CARRYING OUT THE INVENTION

Hereinafter, the exemplary embodiment of the present invention will be described in detail with reference to the drawings. The invention is applied to a limit traveling condition of a vehicle. Because the vehicle resultant force becomes maximum in the limit travel condition of the vehicle, the direction of the vehicle resultant force is used as the vehicle resultant force. First, emergent avoidance problem which is a foundation of the exemplary embodiment will be described. The emergent avoidance problem is considered as follows under this embodiment.

Figure 1:
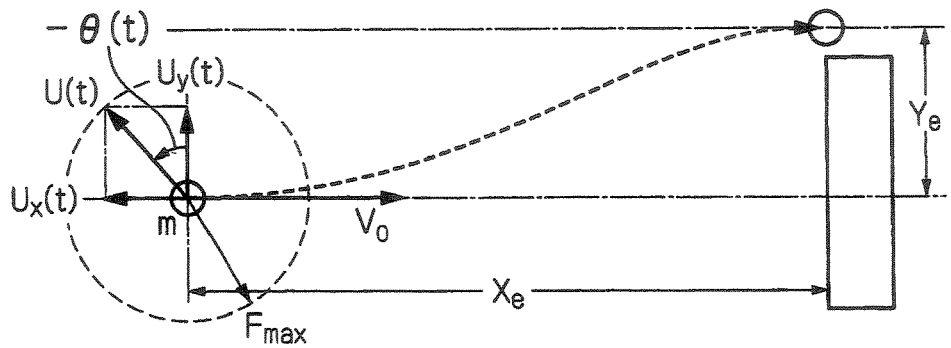
FIG. 1 is a schematic diagram for explaining an emergent avoidance problem.

Assume that a vehicle is a mass point having a mass m and the mass point is moving forward (normal direction of x axis) in the front-rear direction (x axis) of the vehicle in FIG. 1 at the initial speed (initial value in the front-rear direction of the vehicle). Assume that the mass point is moved by only an initial value $Y_e$ in a lateral direction (y-axis direction) to make the lateral speed 0 in order to avoid an obstacle. A distance Xe over which the mass point is moved in the x-axis direction is minimized. Further, forces $u_x(t)$, $u_y(t)$ which are a control input may be applied in the y-axis direction. The magnitude of resultant force is assumed to be $F_{max}$ or less.

This is expressed as a problem for obtaining a control input u(t) which minimizes an equation (5) below under initial, terminating and restraint conditions which are expressed by following equations (1) to (4). Where T is a time which satisfies an equation (3) for the first time under T>0. Further, assume that time differential value of x is 0 or more and the vehicle does not retreat.

[Equation 1]

$$\begin{cases} m\ddot{x} = F_x(t) \\ m\ddot{y} = F_y(t) \end{cases} \quad (1)$$

Initial condition $$\begin{cases} \dot{x}(0) = v_0 \\ \dot{y}(0) = 0 \\ y(0) = 0 \end{cases} \quad (2)$$

Ternimating condition $$\begin{cases} \dot{y}(T) = 0 \\ y(T) = 0 \end{cases} \quad (3)$$

Restraint condition $$F_x(t)^2 + F_y(t)^2 \le F_{max}^2 \quad (4)$$

$$X_e = x(T) - x(0) \quad (5)$$

$$u(t) = \begin{bmatrix} F_x(t) \\ F_y(t) \end{bmatrix} \quad (6)$$

Figure 2:
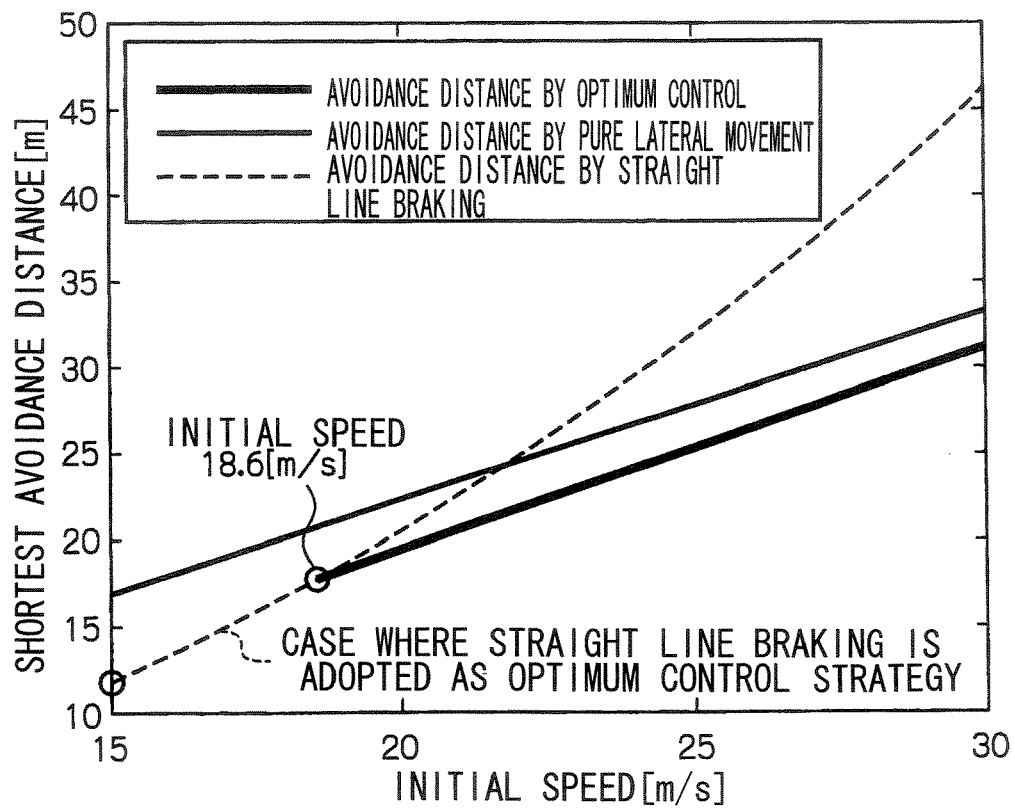
FIG. 2 is a diagram showing differences of avoidance distance by optimum control, avoidance distance by pure lateral movement and avoidance distance by braking in straight travel to the initial speed.
Figure 3:
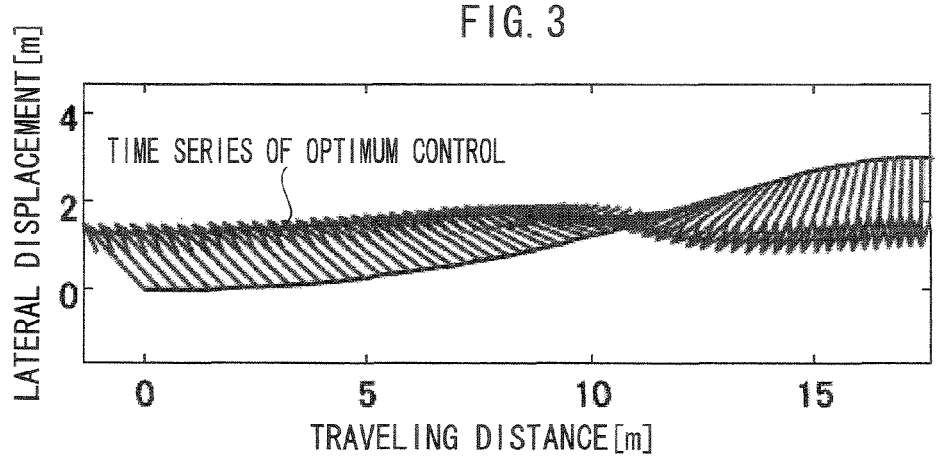
FIG. 3 is a diagram showing control input at the lowest speed in which others than the straight line braking is an optimum control strategy.

Hereinafter, a solution of the aforementioned shortest avoidance problem will be indicated. FIG. 2 shows the shortest avoidance distance to the initial speed when the lateral displacement is 3 m. The obstacle avoidance by straight line braking serves as an optimum control strategy in a range in which the initial speed is low ($v_0$<18.6 m/s), the obstacle avoidance by lateral movement with braking activity serves as an optimum control strategy in a range in which the initial speed is higher than $v_0$. That is, when the lateral displacement is 3 m, if the initial speed exceeds 18.6 m/s, the control input u(t) by the optimum control strategy changes in a discontinuous manner as shown in FIG. 3.

Figure 4:
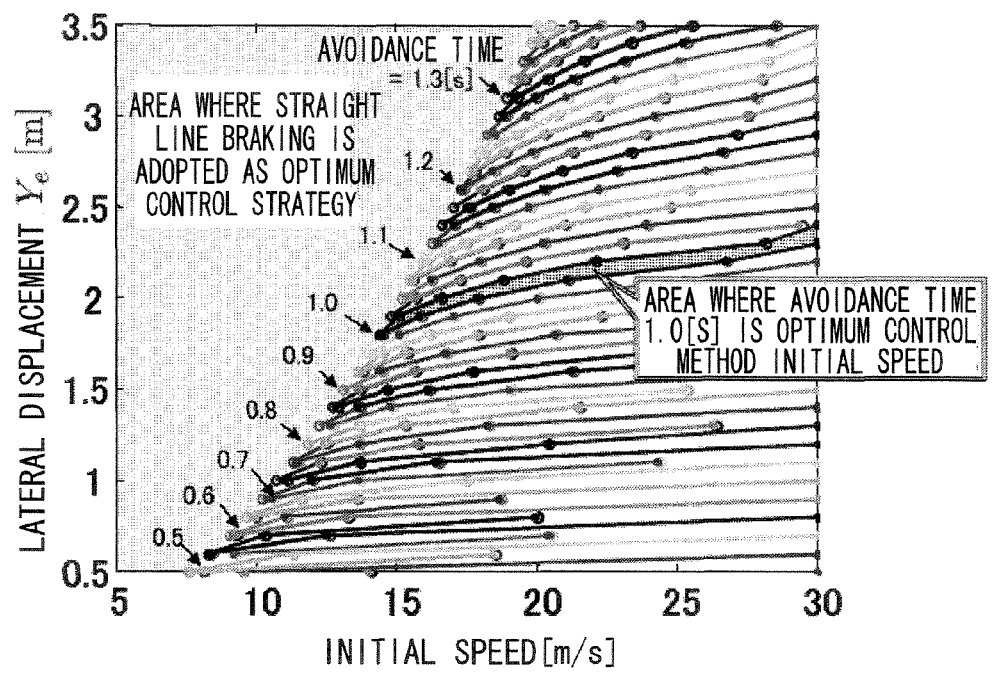
FIG. 4 is a diagram showing an optimum avoidance time to the lateral displacement and the initial speed.

Next, avoidance time $T_e$ and control input by the optimum control strategy will be considered. A result of computation of the avoidance time (hereinafter referred to as optimum avoidance time) which provides initial speed, lateral displacement and shortest avoidance is shown in FIG. 4. In the meantime, this computation expresses the avoidance time $T_e$ so that it is discrete at 0.02 s.

Figure 5:
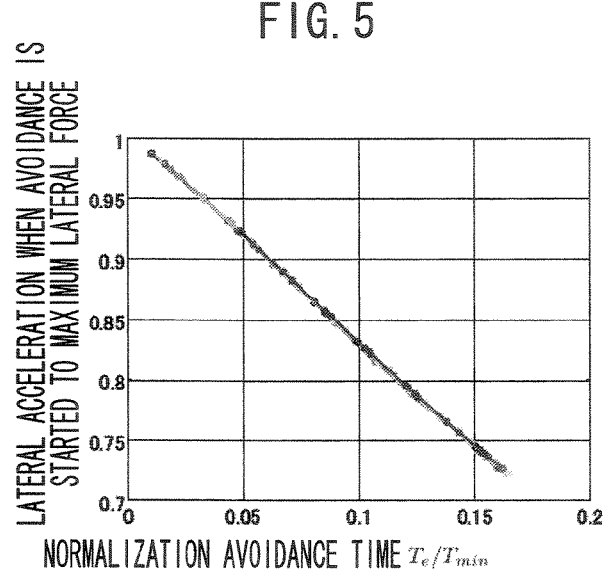
FIG. 5 is a diagram showing the relationship between normalization avoidance time $T_e/T_{min}$ which is a result of normalization of optimum avoidance time using an avoidance time $T_{min}$ by simple lateral movement and lateral acceleration $v_y(0)$ at the time of avoidance start.

A relationship between normalized avoidance time $T_e/T_{min}$ using the avoidance time $T_{min}$ by simple lateral movement for obtaining the optimum avoidance time obtained from FIG. 4 and lateral acceleration $v_y(0)$ at the time of starting of the avoidance may be expressed with a very simple relation shown in FIG. 5.

[Equation 2]

$$\frac{Y_e}{2} = \frac{1}{2m}F_{max}t^2 \quad (7)$$

$$T_{min} = 2t \quad (8)$$

$$= 2\sqrt{2\left(\frac{m}{F_{max}}\right)\left(\frac{Y_e}{2}\right)}$$

Figure 6:
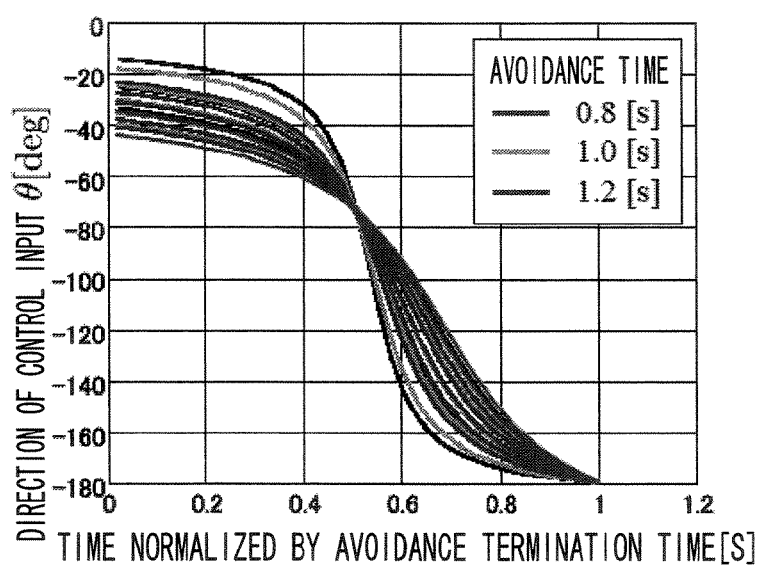
FIG. 6 is a diagram showing a relationship between normalization time and direction of control input by optimum control strategy at the optimum avoidance time.

Time t in the equations (7), (8) is a time taken until it moves over a distance of $Y_e/2$ when all control input is consumed for the lateral movement in case where it moves over the lateral displacement $Y_e$ with deceleration over a distance of $Y_e/2$ after it accelerated up to the distance of $Y_e/2$. The relationship of FIG. 5 indicates how much lateral direction control input at the time of startup of avoidance may be reduced and used for braking force when a long avoidance time is set, as compared to a case of consuming all control input for the lateral movement. Further, if a direction θ of the control input at the time of startup of avoidance is obtained as shown in FIG. 6, an optimum control strategy up to termination of avoidance may be obtained.

Figure 7:
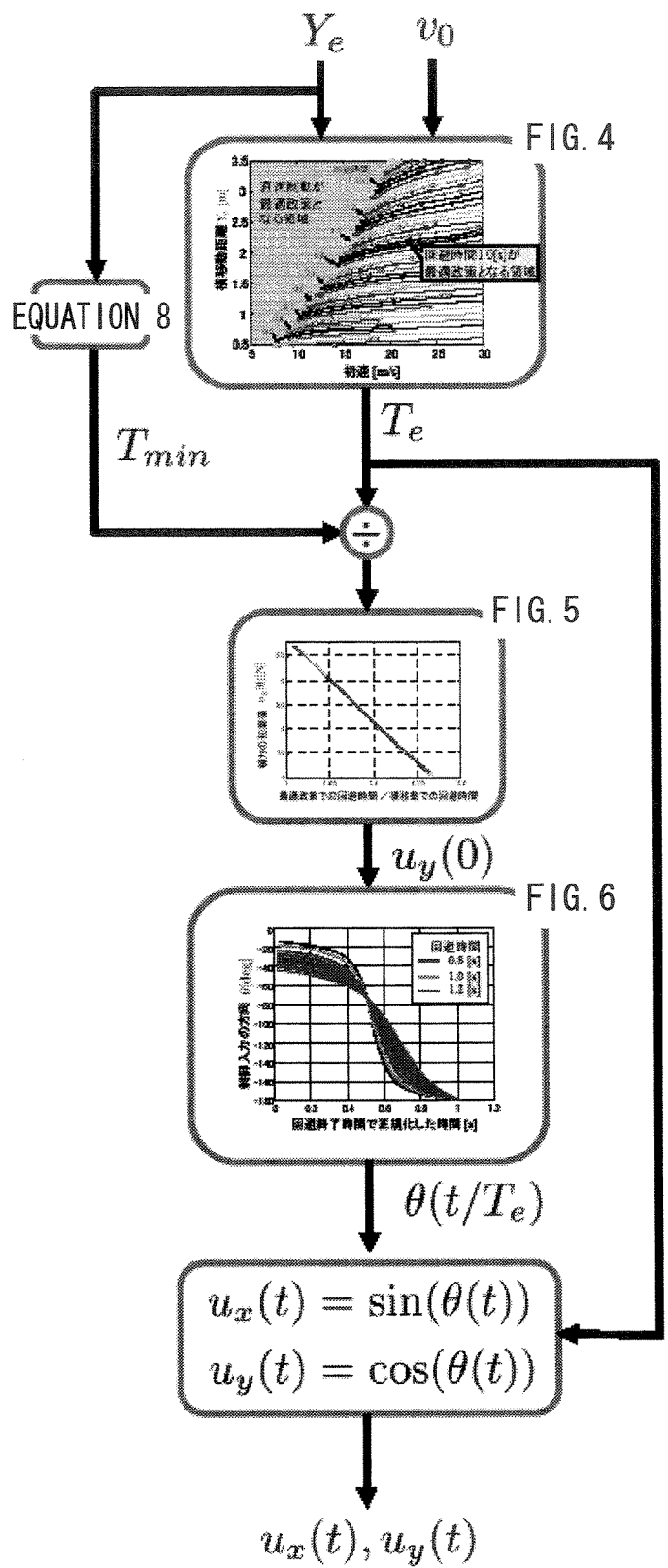
FIG. 7 is a diagram showing a flow chart for obtaining a control input from vehicle speed and quantity of lateral movement.

Using these relations, an optimum control strategy (control input $u_x(t)$, $u_y(t)$) up to termination of avoidance may be obtained by feed forward from the relationship between the lateral displacement $Y_e$ and the initial speed $v_0$ according to a flow chart as shown in FIG. 7. That is, initial avoidance time $T_e$ is obtained from FIG. 4 using the lateral displacement $Y_e$ to avoid an obstacle and the initial speed $v_0$. Normalized avoidance time $T_e/T_{min}$ is obtained by normalizing the obtained initial avoidance time $T_e$ by avoidance time $T_{min}$ by simple lateral movement computed according to the equation (8). A lateral acceleration $v_y(0)$ at the time of startup of avoidance corresponding to the normalized avoidance time $T_e/T_{min}$ is obtained from FIG. 5. A direction $\theta(t/T_e)$ of control input at time $t/T_e$ normalized by the initial avoidance time $T_e$ is obtained about a lateral acceleration $v_y(0)$ from a map of FIG. 6 which defines a relation between the direction θ of the control input under each lateral acceleration $v_y(0)$ and the normalization time $t/T_e$ and then, control inputs $u_x(t)$, $u_y(t)$ are obtained as sin θ(t) and cos θ(t) respectively from the obtained control input direction θ and the initial avoidance time $T_e$.

As described above, the optimum control strategy may be obtained by relatively simple mapping operation by paying attention and summarizing to the relationship between the time $T_{min}$ necessary for avoidance by the simple lateral movement and the initial optimum avoidance time $T_e$.

Figure 8:
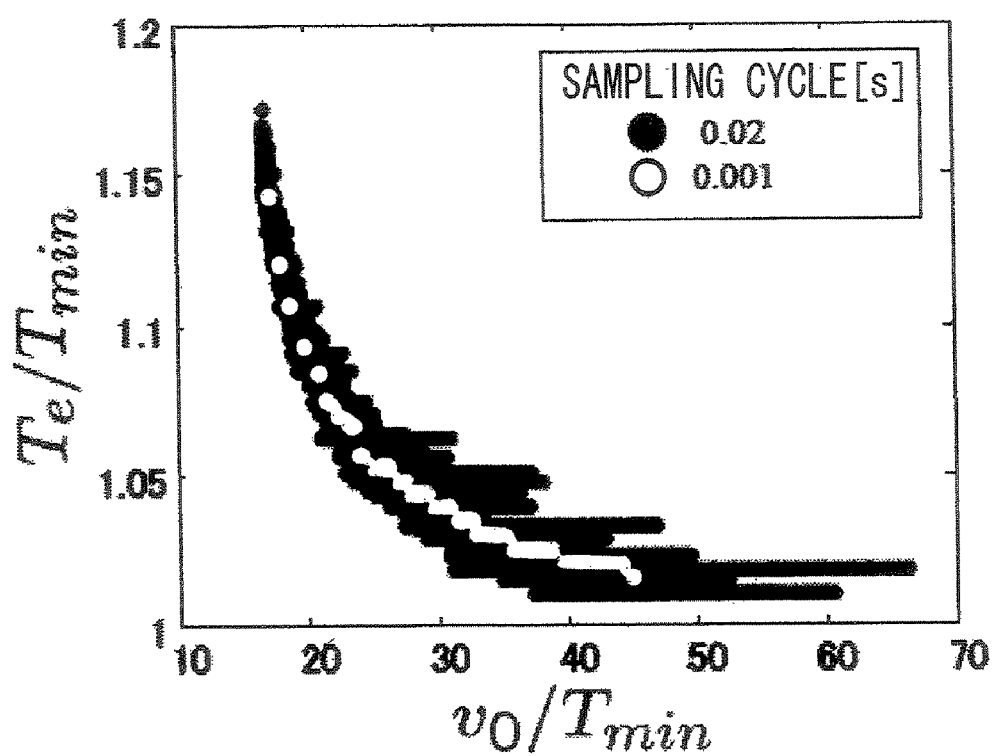
FIG. 8 is a diagram showing a relationship between the initial speed normalized by $T_{min}$ and the optimum avoidance time.

If the ordinate axis and the abscissa axis of FIG. 4 are normalized each by $T_{min}$ by paying attention to $T_{min} \propto \sqrt{(Y_e)}$ as shown in the equation (8), a result as shown in FIG. 8 is obtained and thus, a difference of the quantity of the lateral movement may be cancelled. In the meantime, because of $T_{min} \propto \sqrt{(Y_e)}$, the same result is obtained if it is normalized by $\sqrt{(Y_e)}$ instead of $T_{min}$.

Figure 9:
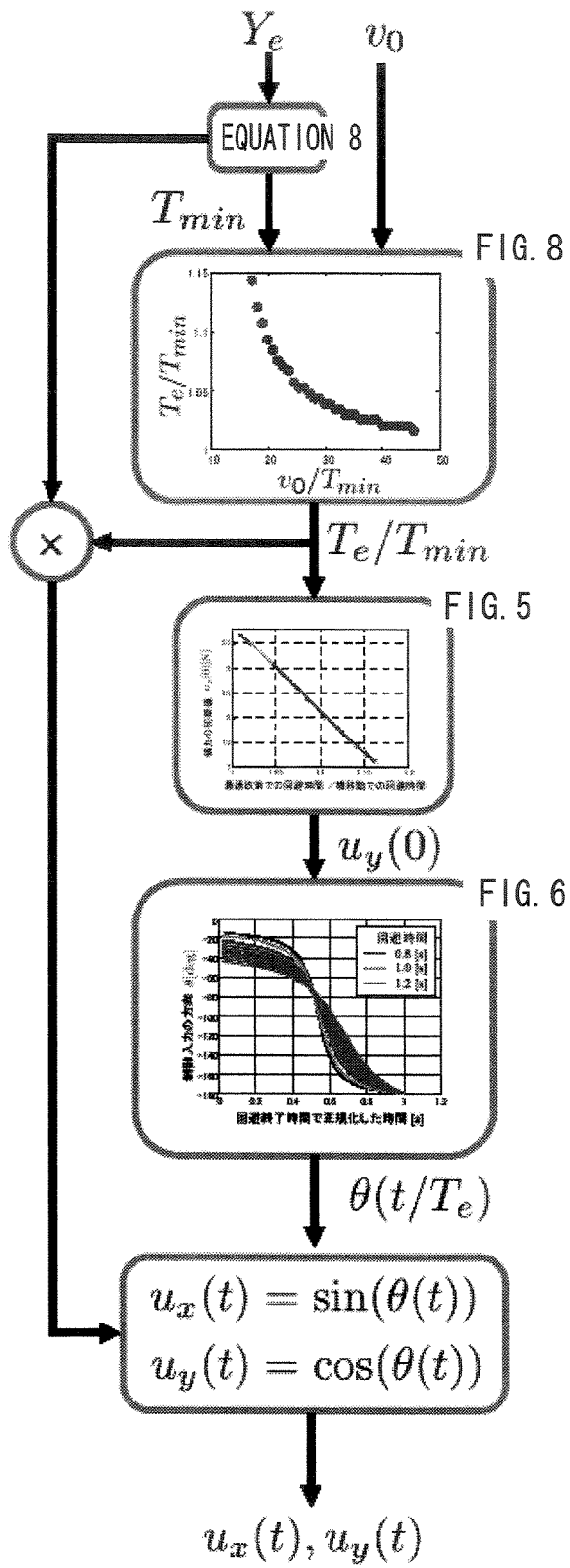
FIG. 9 is other flow chart for obtaining a control input from vehicle speed and quantity of lateral movement.

In case of sampling cycle 0.02 s for use in the computation up to here, dispersion occurs due to error due to discrete time system as indicated with ●. However, if an optimum solution is obtained using a shorter sampling cycle of 0.001 s, it may be expressed with a very simple relation as shown with ○. By using this relation, the flowchart shown in FIG. 7 is turned to a processing using a simple map as shown in FIG. 9, so that the control inputs may be obtained as sin θ(t) and cos θ(t) respectively. That is, in FIG. 7, the step using FIG. 8 is used instead of the step using FIG. 4. Consequently, time $T_{min}$ is computed according to the equation (8) and normalized avoidance time $T_e/T_{min}$ is obtained from the computed time $T_{min}$, vehicle speed $v_0$ and FIG. 8, so that a control input may be obtained like the flow chart of FIG. 7.

As described above, an optimum control strategy (control input $u_x(t)$, $u_y(t)$) up to termination of avoidance may be obtained from the lateral displacement $Y_e$ and the vehicle speed $v_0$. However, to perform robust control to changes of movement of a vehicle corresponding to a movement of an obstacle or various disturbances, feedback control using such information is needed. Then, feedback controller for obtaining the control inputs ($u_x(t)$, $u_y(t)$) (hereinafter the control input will be described by disassembling it to front-rear force and lateral force) of a vehicle which should be outputted at a next sampling time from the front-rear speed/lateral speed ($v_x(t)$, $v_y(t)$) of the vehicle at a current time t and a lateral displacement $Y_e'$ needed in future (t) will be described below.

As shown in FIG. 10, the condition t ($v_x(t)$, $v_y(t)$, $Y_e'(t)$) is turned to a condition halfway of the optimum control strategy with the initial speed $v_0$ and the lateral displacement $Y_e$ (condition 0: the initial lateral speed is 0 at this time) as a beginning point. At this time, the optimum avoidance with a condition t as a beginning point coincides with the optimum control strategy after a time t of the optimum control strategy with the condition 0 as a beginning point. Here, the optimum control strategy with the condition 0 as a beginning point has been already obtained as described above. Thus, if which time t of which condition 0($v_0$, $Y_e$) the condition t corresponds to is known, an optimum control strategy from the condition t may be obtained. With such a feedback controller, even if the condition t is deviated from the optimum avoidance due to disturbance or modeling error or the like condition t'($v_x'$, $v_y'$, $Y_e''$) as shown in FIG. 11, new optimum control strategy ($u(v_x', v_y', Y_e'')$) may be obtained by feeding back of the condition t'. That is, robustness against disturbance is secured. All the optimum control strategies up to termination of avoidance do not need to be obtained but it is sufficient if only a control input ($u|_{t=0}$) which should be outputted currently is obtained.

Consequently, a control input may be obtained in a following computation procedure of the feedback control input.

(Procedure 1) obtain which time t in the optimum control strategy from the condition 0 ($v_0$, $Y_e$) a current condition t($v_x$, $v_y$, $Y_e'$) corresponds to.

(Procedure 2) obtain a control input u(t) which the optimum control strategy in the condition 0 should output at a time t.

Figure 12:
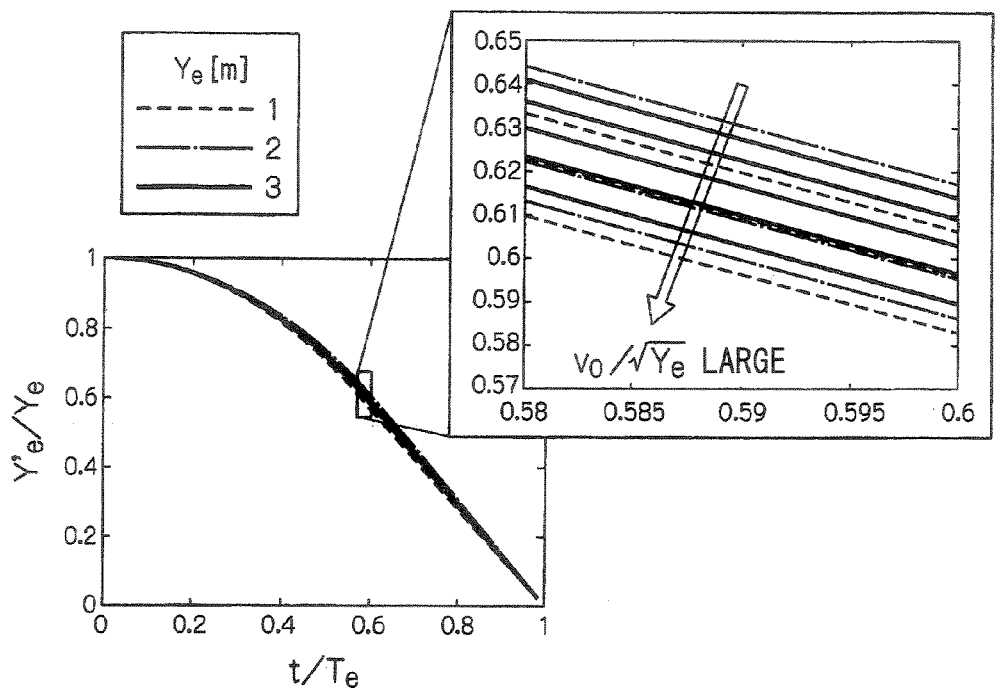
FIG. 12 is a diagram showing a relationship between the quantity of lateral movement and avoidance time.
Figure 13:
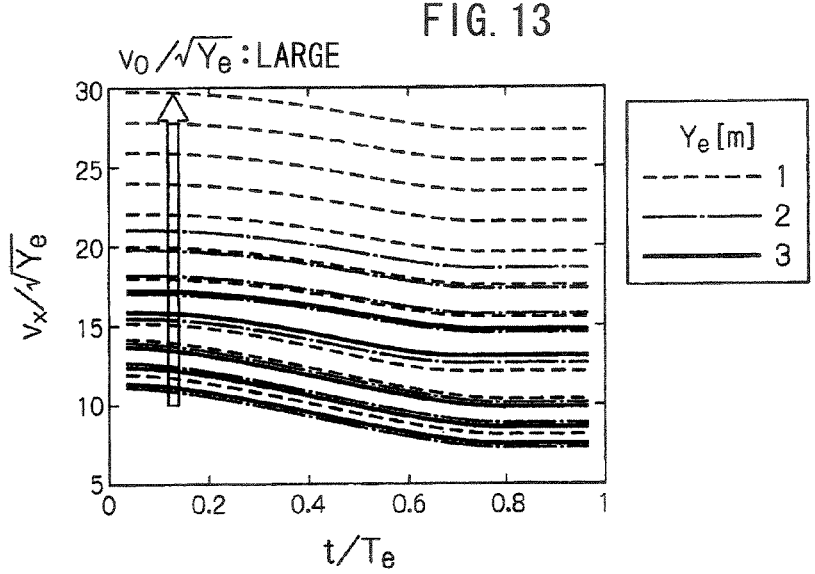
FIG. 13 is a diagram showing a relationship between vehicle speed and avoidance time.
Figure 14:
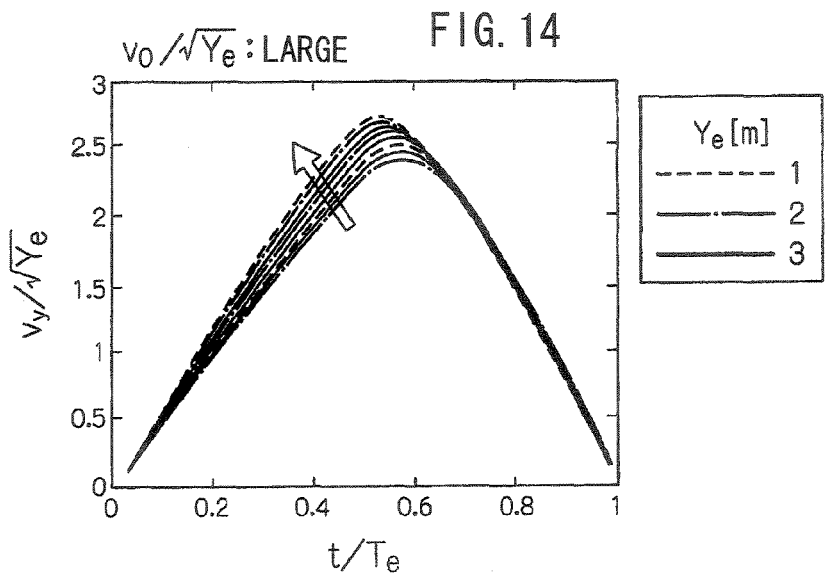
FIG. 14 is a diagram showing a relationship between the lateral speed and avoidance time.

Hereinafter, the procedure 1 and the procedure 2 will be described. If summarizing the optimum avoidance described above, it may be expressed with three two-dimensional maps (expressed by the following equations (9)-to (11)) using a parameter $v_0/\sqrt{(Y_0)}$ obtained by normalizing $v_0$ with ½ power ($\sqrt{(Y_e)}$) of the lateral displacement $Y_e$. FIG. 12 shows a map which specifies a relationship between a parameter $t/T_e$ expressed by a current time t normalized by the initial avoidance time $T_e$ and a parameter $Y_e'/Y_e$ expressed by a current lateral displacement $Y_e'$ normalized by the initial lateral displacement $Y_e$ for each parameter $v_0/\sqrt{(Y_0)}$. FIG. 13 shows a map which specifies a relationship between the parameter $t/T_e$ and the parameter $v_x/\sqrt{(Y_e)}$ for each parameter $v_0\sqrt{(Y_e)}$. FIG. 14 shows a map which specifies a relationship between the parameter $t/T_e$ and the parameter $v_y/\sqrt{(Y_e)}$ for each parameter $v_0/\sqrt{(Y_e)}$.

[Equation 3]

$$\frac{Y_e'}{Y_e} = f\left(\frac{t}{T_e'}, \frac{v_0}{\sqrt{Y_e}}\right) \quad (9)$$

$$\frac{v_x}{\sqrt{Y_e}} = g\left(\frac{t}{T_e'}, \frac{v_0}{\sqrt{Y_e}}\right) \quad (10)$$

$$\frac{v_y}{\sqrt{Y_e}} = h\left(\frac{t}{T_e'}, \frac{v_0}{\sqrt{Y_e}}\right) \quad (11)$$

Figure 15:
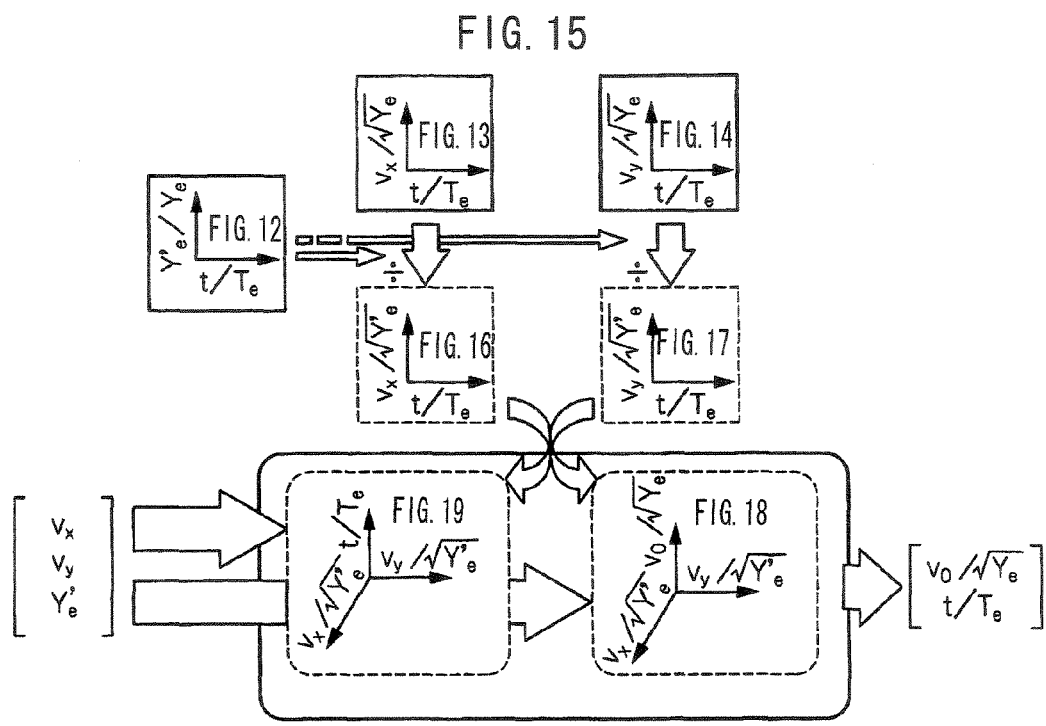
FIG. 15 is a diagram showing a procedure 1 for generating a map for obtaining condition $(v_0, t/Y_e)$ from condition $t(v_x, v_y, Y_e')$.

Then, a map for obtaining the condition 0 ($v_0$, $t/Y_e$) from the condition t($v_x$, $v_y$, $Y_e'$) is generated in a procedure shown in FIG. 15. First, the lateral displacement $Y_e$ of the condition 0, that is, the lateral displacement $Y_e$ is erased from the equation 9 (FIG. 12) and the equation 10 (FIG. 13). Because the straight line braking is an optimum solution in case where $v_x$ is 0, it is not contained in this map which indicates an optimum solution for avoidance, so that $v_0 > 0$ is established.

Figure 16:
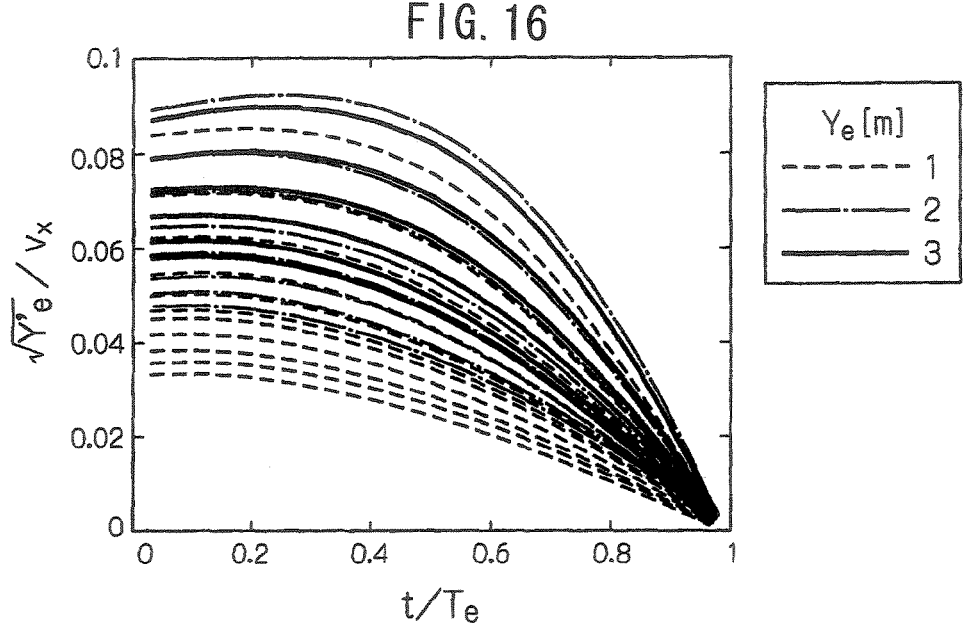
FIG. 16 is a diagram showing a relationship between an inverse number of front-rear speed normalized by remaining lateral displacement and avoidance time.
Figure 17:
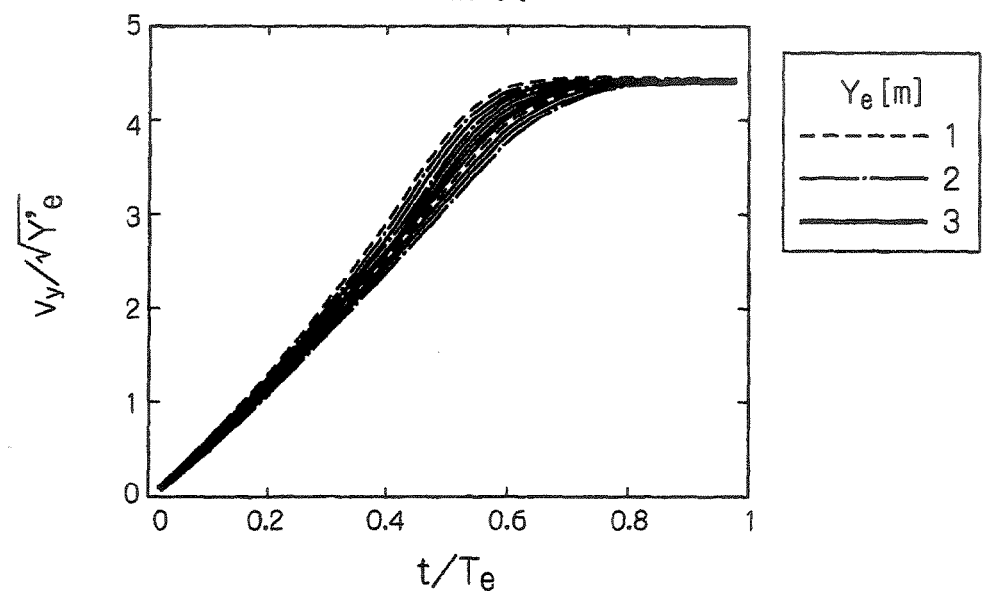
FIG. 17 is a diagram showing a relationship between lateral speed normalized by remaining lateral displacement and avoidance time.

On the other hand, $Y_e'$ converges to 0 as the avoidance progresses ($t/Y_e \to 1$). Thus ½ power the equation (9) is divided by the equation (10) so as to obtain a following equation (12) (FIG. 16). Likewise, the equation (11) is divided by ½ power the equation (9) and $Y_e$ is erased from the equation 9 (FIG. 12) and the equation (11) (FIG. 14) so as to obtain a following equation (13) (FIG. 17).

[Equation 4]

$$\frac{\sqrt{Y_e'}}{v_x} = \frac{\sqrt{f}}{g} = g'\left(\frac{t}{T_e'}, \frac{v_0}{\sqrt{Y_e}}\right) \quad (12)$$

$$\frac{v_y}{\sqrt{Y_e'}} = \frac{h}{\sqrt{f}} = h'\left(\frac{t}{T_e'}, \frac{v_0}{\sqrt{Y_e}}\right) \quad (13)$$

Although as described above, $Y_e' \to 0$ is established when $t/T_e$, $v_y$ also converges to 0. Here, because $F_{max} = mg$ is established under frictional coefficient $\mu = 1$ between a road surface and tire, the control input at the time of termination of avoidance is $u_y(T_e) = F_{max}$ and at this time, a following equation (14) (FIG. 17) is established.

[Equation 5]

$$\left.\frac{v_y}{\sqrt{Y_e'}}\right|_{\frac{t}{T_e'} \to 1} = \left.\frac{\frac{F_{max}}{m}}{\sqrt{\frac{1}{2m}F_{max}t^2}}\right|_{t \to 1} = \sqrt{2\frac{F_{max}}{m}} \cong 4.43 \quad (14)$$

Figure 18:
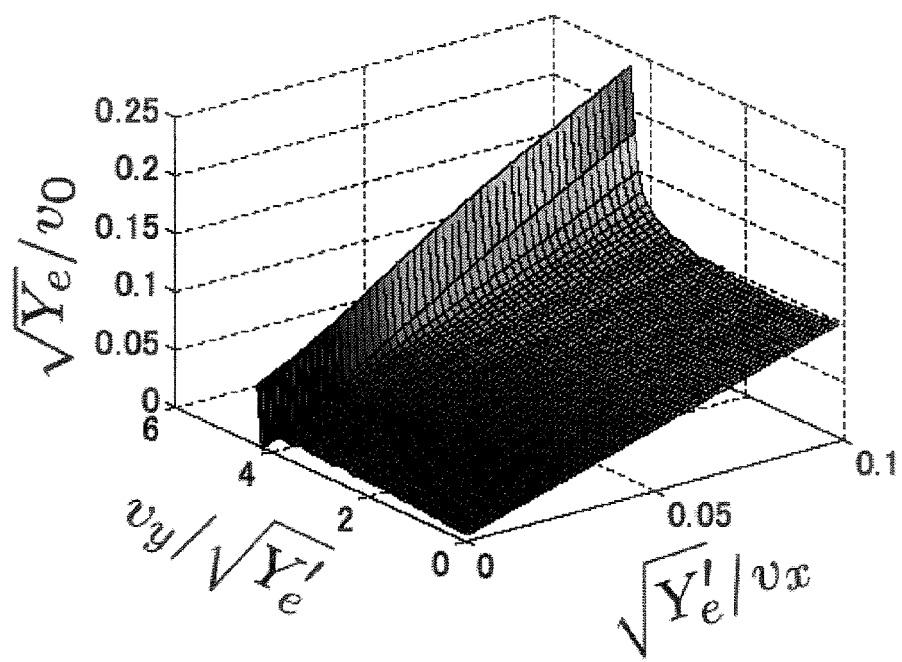
FIG. 18 is a diagram showing a map for obtaining the initial speed $v_0$ under original condition 0 from the front-rear/lateral speed and avoidance distance.
Figure 19:
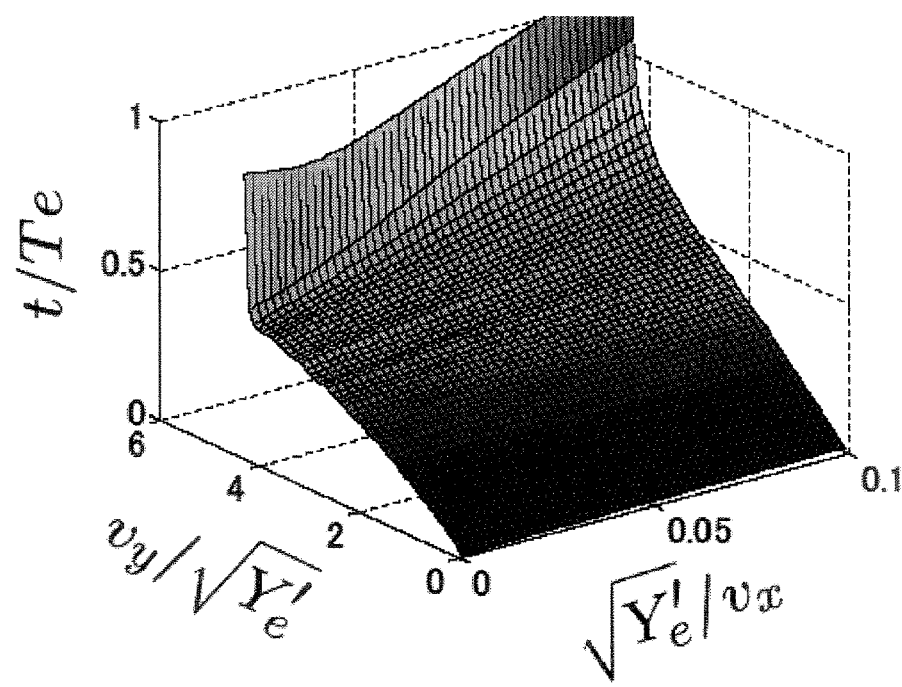
FIG. 19 is a diagram showing a map for obtaining a time t under original condition 0 from front-rear/lateral speed.

A map (FIG. 18, FIG. 19) expressed by following equations (15), (16) are obtained from the equations (12), (13) (FIG. 16, FIG. 17) obtained in the above manner. The map of FIG. 18 is for obtaining the initial speed $v_0$ in the original condition 0 from the front-rear/lateral speed and avoidance distance by specifying a relationship among the parameter $\sqrt{(Y_e')}/v_x$ and $v_y/\sqrt{(Y_e')}$ and $\sqrt{(Y_e)}/v_0$. The map of FIG. 19 is for obtaining a time t in the original condition 0 from the front-rear/lateral speed by specifying a relationship among the parameter $\sqrt{(Y_e')}/v_x$, $v_y/\sqrt{(Y_e')}$ and $t/T_e$.

[Equation 6]

$$\frac{v_0}{\sqrt{Y_e}} = g''\left(\frac{\sqrt{Y_e'}}{v_x}, \frac{v_y}{\sqrt{Y_e'}}\right) \quad (15)$$

$$\frac{t}{T_e} = h''\left(\frac{\sqrt{Y_e'}}{v_x}, \frac{v_y}{\sqrt{Y_e'}}\right) \quad (16)$$

Figure 20:
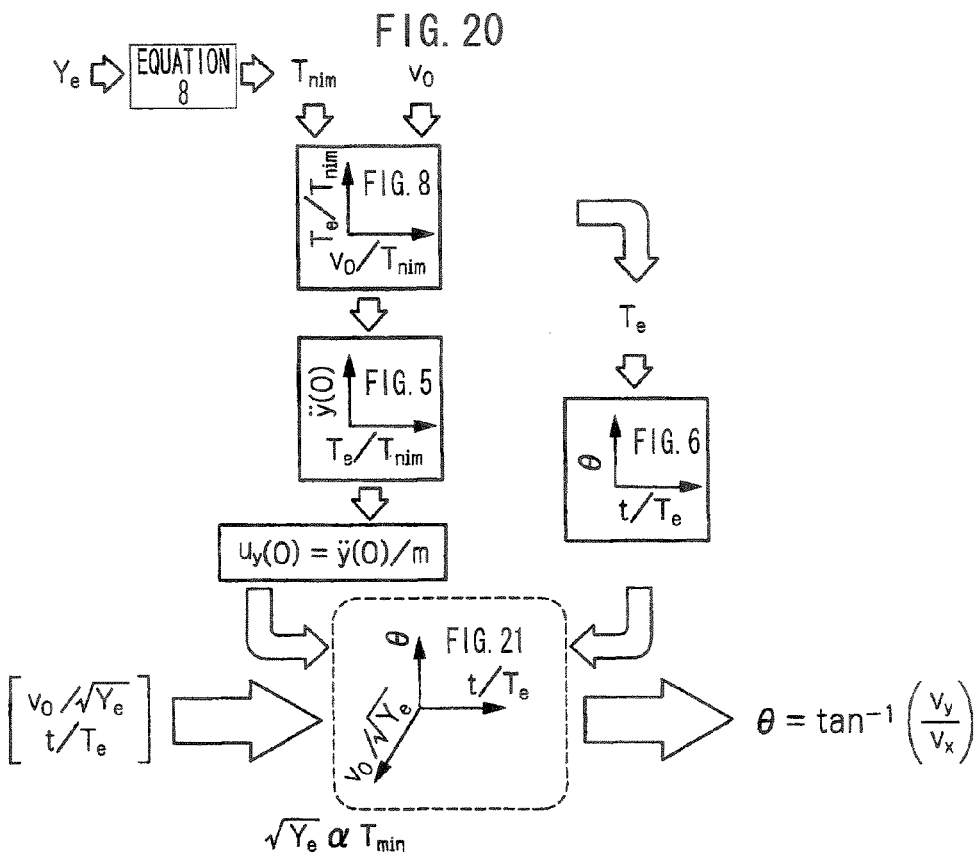
FIG. 20 is a diagram showing a procedure 2 for obtaining the direction of control input.

A control input u(t) which the optimum control strategy in the condition 0 should output is obtained from FIG. 5, FIG. 6 and FIG. 8 according to the procedure of FIG. 20. First, $v_0/T_{min}$ is obtained from the initial speed $v_0$ in the condition 0, the avoidance distance $Y_e$ and the equation (8). Further, the initial value $u_y(0)$ of the control input in the lateral direction is obtained through FIG. 5 and FIG. 8. Here, the control input always satisfies following equation (17) and equation (18) in the condition of the shortest avoidance and when $u_y(t)$ is determined, θ (t) is determined.

[Equation 7]

$$u_x(t)^2 + u_y(t)^2 = F_{max} \quad (17)$$

$$u_x(t)^2 \leq 0 \quad (18)$$

That is, the initial value θ(0) in the direction of the control input is obtained from FIG. 5 and FIG. 6. Here because $\sqrt{(Y)_e} \propto T_{min}$ is provided, a following equation (19) is obtained.

[Equation 8]

$$\theta(0) = P(v_0/\sqrt{Y_e}) \quad (19)$$

Figure 21:
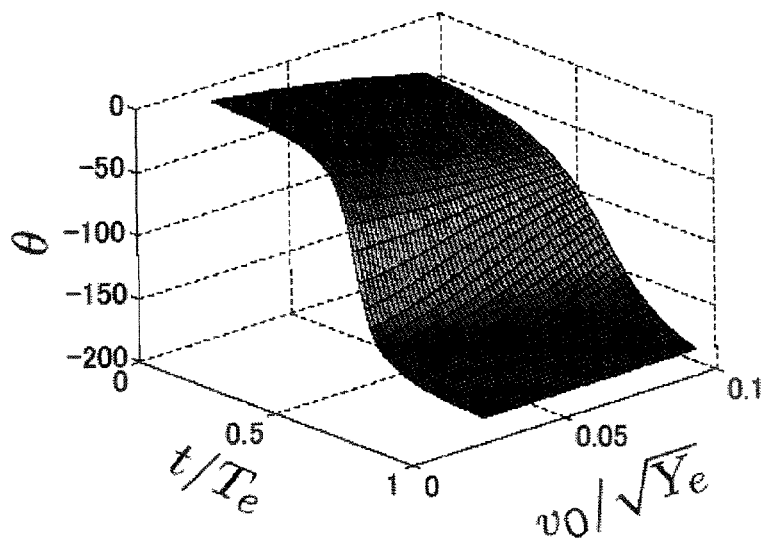
FIG. 21 is a diagram showing a map for obtaining a control input direction θ from the initial speed $v_0$ of the original condition 0 and the current time.

On the other hand, if θ(0) is determined from FIG. 6, the θ(t) at a time $t/T_e$ after that is obtained. Thus, a map shown in FIG. 21 is obtained. The map of FIG. 21 is for obtaining the direction θ of a control input from the initial speed $v_0$ in the original condition 0 and the current time by specifying a relationship between the parameter $v_0/\sqrt{(Y_e)}$ and $t/T_e$ and θ.

Figure 22:
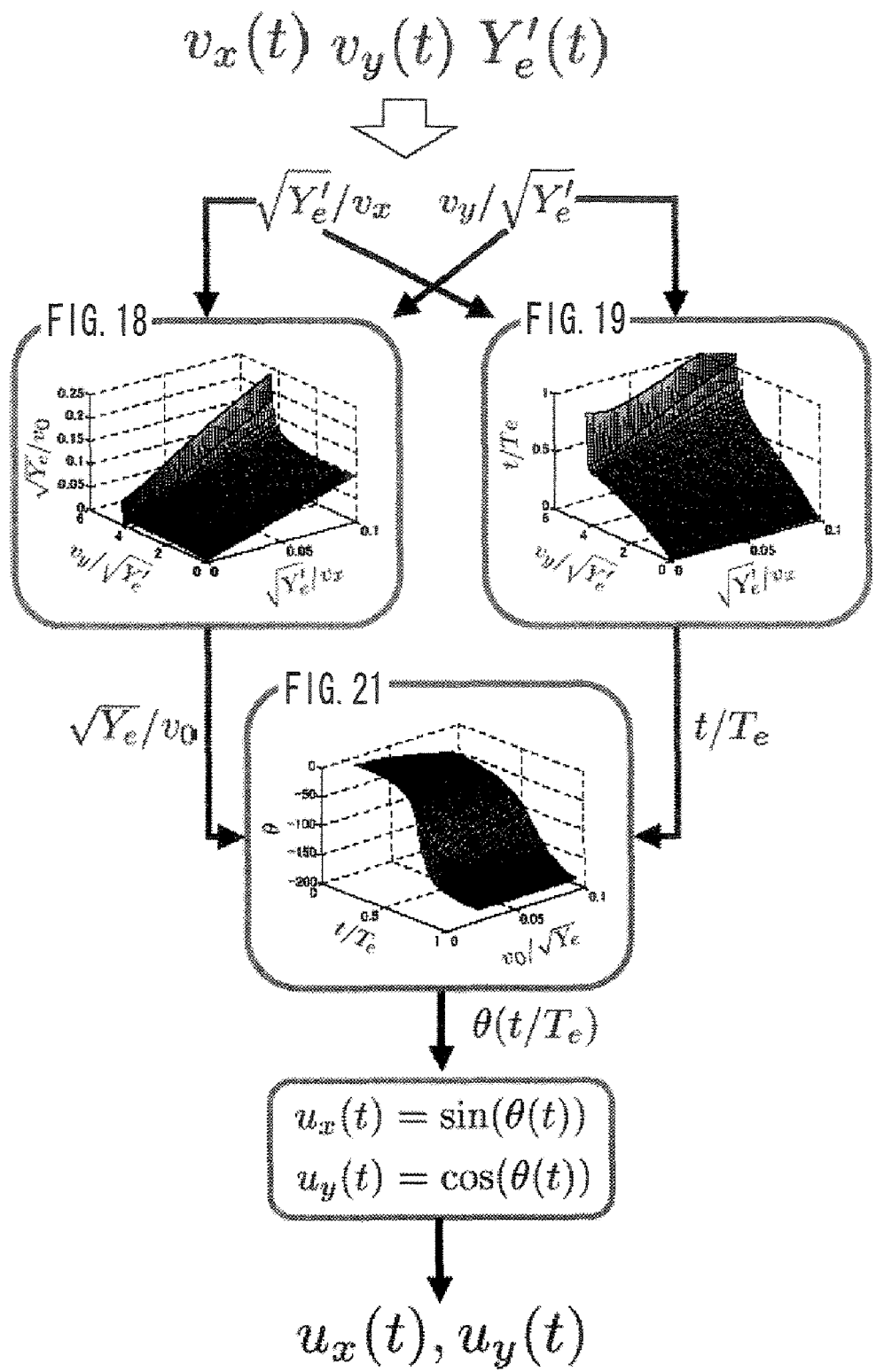
FIG. 22 is a flow chart for obtaining an optimum control input by feed back of a vehicle condition and remaining avoidance distance.

Using the three maps (FIG. 18, FIG. 19 and FIG. 21) obtained in the above manner, an optimum control strategy u(t) in the condition t can be obtained from the current condition $t(v_x, v_y, Y_e')$ according to the flowchart shown in FIG. 22. That is, according to the flowchart of FIG. 22, the avoidance time $T_e$ in the initial condition, the front-rear/lateral direction speed $v_x(t)$, $v_y(t)$ in the current condition and the lateral displacement $Y_e'(t)$ are obtained and the parameters $\sqrt{(Y_e')}/v_x$ and $v_y/\sqrt{(Y_e')}$ are computed. Using the computed parameters $\sqrt{(Y_e')}/v_x$ and $v_y/\sqrt{(Y_e')}$, the parameter $\sqrt{(Y_e)}/v_0$ is obtained from the map shown in FIG. 18 and the parameter $t/T_e$ is obtained from the map shown in FIG. 19. Then, using the obtained parameters $\sqrt{(Y_e)}/v_0$ and $t/T_e$, the direction $\sqrt{(t/T_e)}$ of the control input at the time $t/T_e$ is obtained from the map shown in FIG. 21. After that, a final control input is obtained using the initial avoidance time $T_e$ and the direction $\sqrt{(t/T_e)}$ of the control input.

Figure 23:
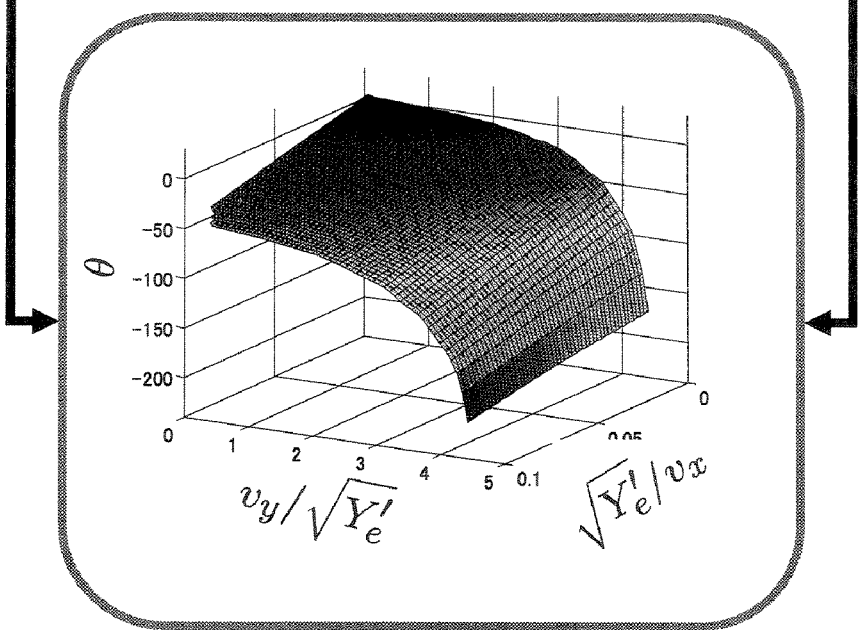
FIG. 23 is a flow chart for obtaining an optimum control input by feedback using a map.

Finally, the three maps (FIG. 18, FIG. 19 and FIG. 21) for use in the flowchart of FIG. 22 may be summarized into a simple map. The flowchart of FIG. 22 may be expressed with a flowchart using a simple map shown in FIG. 23.

The feedback controller can be obtained by a simple mapping operation described above. However, in case of the lateral speed 0, a control input is obtained such that the optimum control strategy is interpolated successively. Thus, a condition which cannot exist in a trajectory of the optimum control strategy from the condition at the lateral speed 0 becomes out of the map used in FIG. 22 or FIG. 23, so that no appropriate control input may be obtained. For example, a condition having the lateral speed in an opposite direction to the direction of avoidance falls under this. However, in such a case, an optimum solution may be obtained by processing of disassembling a problem into some phases.

In the meantime, because $\sqrt{(Y_e)} \propto T_{min}$, a parameter using $T_{min}$ may be used instead of $\sqrt{(Y_e')}$ in the map shown in FIG. 18, FIG. 19, FIG. 21 and FIG. 23 and a parameter whose denominator and numerator are replaced with each other may be used.

Figure 24:
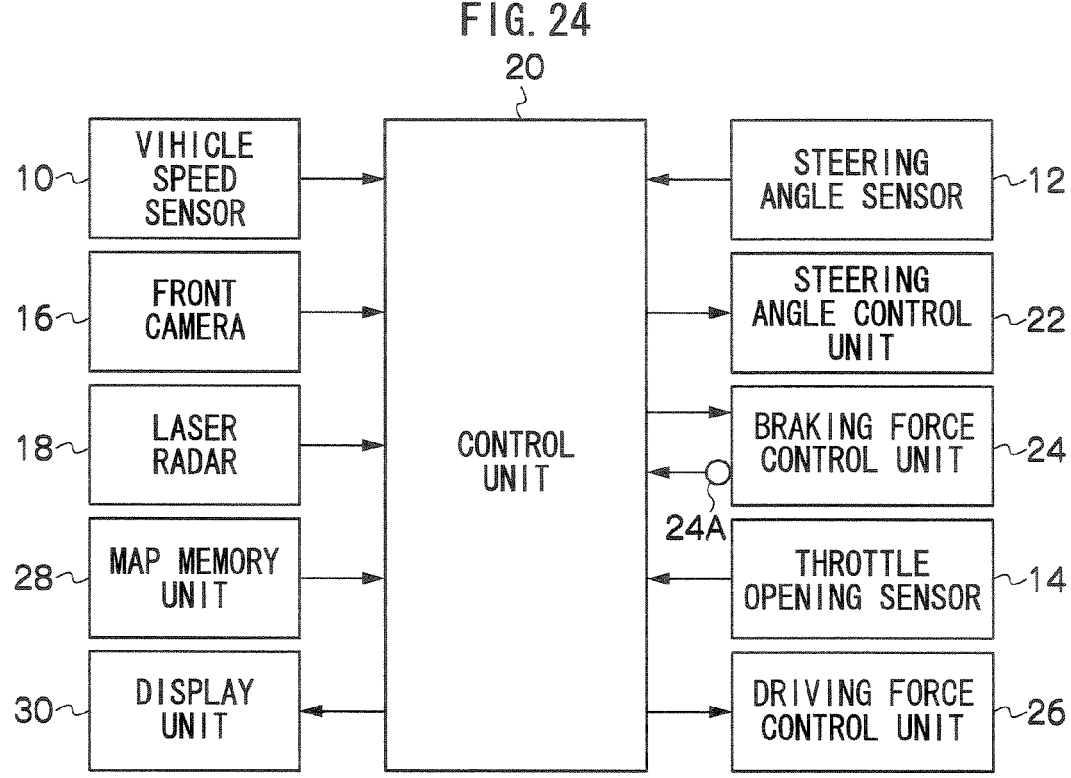
FIG. 24 is a block diagram showing an exemplary embodiment of the invention.

Hereinafter, the exemplary embodiment of the invention based on the above-described principle will be described in detail. As shown in FIG. 24, the obstacle avoidance control device of this exemplary embodiment includes a control unit which executes avoidance motion for avoiding an obstacle by controlling vehicular machines loaded on a vehicle so as to control the motion of the vehicle based on detection data from a sensor group loaded on the vehicle as a traveling condition detecting device for detecting a traveling condition of the vehicle, a sensor group loaded on the vehicle as an external environment detecting device for detecting the external environment condition and detection data from these sensor groups, or a display unit 30 for notifying a vehicle driver of obstacle avoidance information.

As the sensor group for detecting a traveling condition of the vehicle of the vehicle movement control unit, a vehicle speed sensor 10 for detecting a vehicle speed, a steering angle sensor 12 for detecting a steering angle and a throttle opening degree sensor 14 for detecting the degree of opening of a throttle valve are provided.

As the sensor group for detecting the external environment condition, a camera 16 for taking pictures of the front area of the vehicle and a laser radar 18 for detecting an obstacle in front of the vehicle are provided. In the meantime, it is permissible to provide a millimeter wave radar with the laser radar instead of the laser radar.

The front camera 16 is mounted on the top of a front window of the vehicle in order to take picture of the front area of the vehicle. The front camera 16 comprises a small CCD camera or CMOS camera and takes pictures of an area including a road condition in front of the vehicle and image data obtained by photographing is outputted. An outputted image data is inputted to a control unit 20 comprising a microcomputer and the like. In the meantime, a front infrared ray camera may be provided in addition to the front camera 16. A pedestrian may be detected securely as an obstacle using an infrared camera. The near-infrared ray camera may be used instead of the infrared ray camera and in this case also, the pedestrian may be detected securely.

The laser radar 18 comprises a light emitting device composed of semiconductor laser for scanning horizontally by irradiating infrared ray pulse and a light receiving device for receiving infrared ray pulse reflected by an obstacle (pedestrian, vehicle in front and the like) in front of the vehicle and installed on a front grill or bumper of the vehicle. This laser radar 18 may detect a distance from the vehicle to an obstacle in front based on an arrival time of reflected infrared ray pulse until it is received by the light receiving device with reference to a time when it is projected from the light emitting device. Data indicating a distance up to an obstacle detected by the laser radar 18 is inputted to the control unit 20. The control unit 20 comprises RAM, ROM and CPU. The ROM stores a program of an obstacle avoidance control routine described later.

The control unit 20 is connected to a vehicle loaded unit for carrying out avoidance operation of the vehicle from an obstacle by controlling at least one of steering angle, braking force and driving force of the vehicle. As this vehicle loaded unit, steering angle control unit 22 for controlling the steering angle of a front wheel, a braking force control unit 24 for controlling a braking force by controlling brake hydraulic pressure and a driving force control unit 26 for controlling the driving force are provided. The braking force control unit 24 includes a detection sensor 24A for detecting the braking force. A display unit 30 which notifies a vehicle driver of an obstacle avoidance condition by displaying the direction of a control input computed as described later is connected to the control unit 20. In the meantime, it may be notified to the direction of the obstacle that the obstacle avoidance control is carried out.

As the steering angle control unit 22, it is permissible to use a control unit for controlling the steering angle of at least one wheel of the front wheel and the rear wheel so as to overlap a steering wheel operation of the vehicle driver, a control unit (so-called steer by wire) for controlling the steering angle of at least one of the front wheel and the rear wheel independently of the steering wheel operation.

As the braking force control unit 24, it is permissible to use a control unit for controlling the braking force of each wheel individually independently of the driver operation, for use in so-called ESC (Electronic Stability Control), a control unit (so-called brake by wire) for controlling the braking force of each wheel arbitrarily through a signal line, separated mechanically from the driver operation.

As the driving force control unit 26, a control unit for controlling a driving force by controlling a throttle opening, a delay angle of timing advance or fuel injection quantity, a control unit for controlling the driving force by controlling a speed change position of a transmission, a control unit for controlling at least one of the driving force in the front-rear direction and the right-left direction by controlling a torque transfer and the like may be used.

A map memory unit 28 which stores the three maps of FIG. 18, FIG. 19 and FIG. 21 described above and one map shown in FIG. 23 is connected to the control unit 20. In the map of this exemplary embodiment, a map using a first parameter determined by a ratio ($\sqrt{(Y_e')}/v_x(t)$) of a square root of a vehicle lateral direction distance $Y_e'$ in order to avoid an obstacle against a component $v_x(t)$ in the vehicle longitudinal direction of a relative speed and a second parameter determined by a ratio ($v_y(t)/\sqrt{(Y_e')}$) of a component $v_y$ in the vehicle lateral direction of the relative speed to a square root of the vehicle lateral direction distance $Y_e'$ in order to avoid an obstacle is used.

As shown in FIG. 2, the shortest avoidance distance increases as the initial speed increases and if a distance $Xs(t)$ between the vehicle and the obstacle becomes less than the shortest avoidance distance, the avoidance control is disabled. Thus, the map shown in FIG. 2 is memorized in the map memory unit 28 in order to determine an avoidance control start.

Figure 26:
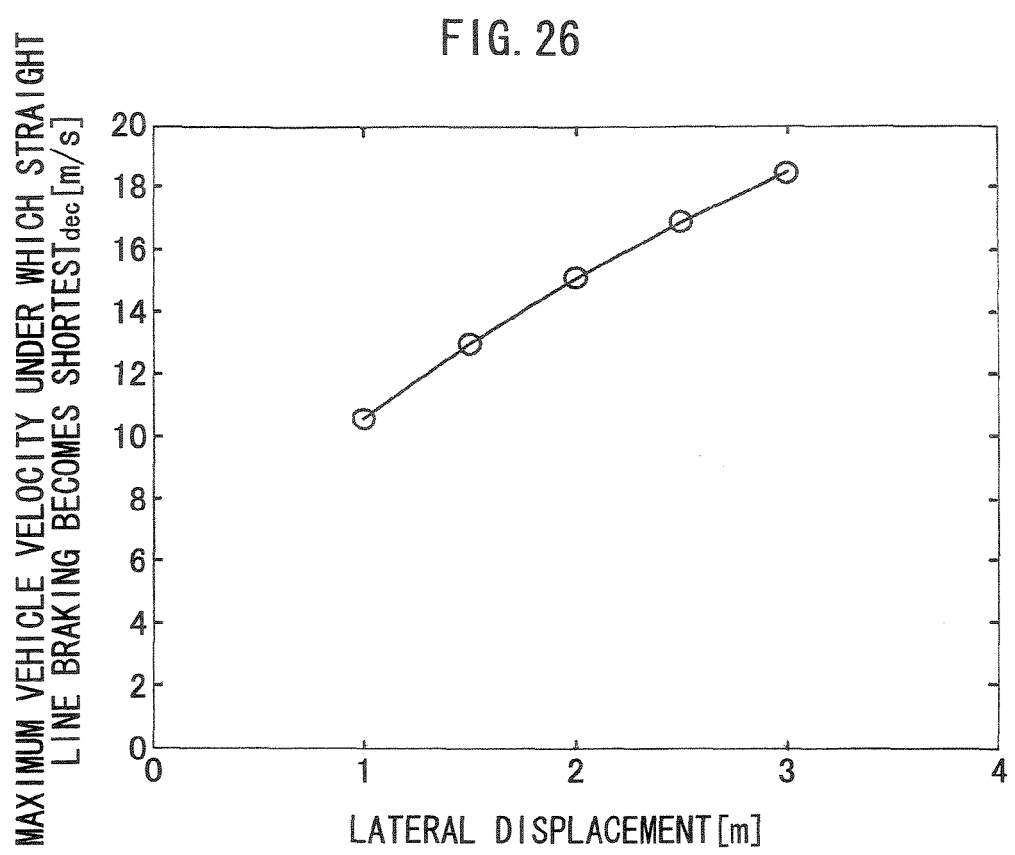
FIG. 26 is a diagram showing a relationship between a lateral displacement and a maximum vehicle speed which achieves straight line braking over the shortest distance.

In case where the lateral displacement $T_e$ is 3 m and the initial speed is 18.6 m/s, the straight line braking turns to the optimum control strategy. A relationship between the lateral displacement $T_e$ and the maximum vehicle speed $v_{dec}$ when the straight line braking turns to the optimum control strategy is shown in FIG. 26. The maximum vehicle speed $V_{dec}$ decreases gradually with a reduction of the lateral displacement $T_e$ from 18.6 m/s. That is, if the speed $v_x(t)$ in the vehicle longitudinal direction is $v_x(t) \leq v_{dec}$ when the lateral displacement T is less than 3 m, the case by the straight line braking turns to the shortest obstacle avoidance control. Thus, the map shown in FIG. 26 is memorized in the map memory unit 28 in order to determine whether or not the straight line braking should be selected.

An alarm unit not shown for dispatching an alarm to the vehicle driver is connected to the control unit 20. As the alarm unit, it is permissible to use a unit for dispatching an alarm by sound or voice, a unit for dispatching an alarm by light or visual indication or a physical quantity applying unit for guiding a driver's operation by giving a physical quantity such as steering reaction force to a vehicle driver. Further, the display unit 30 may be used as an alarm unit.

Figure 25A:
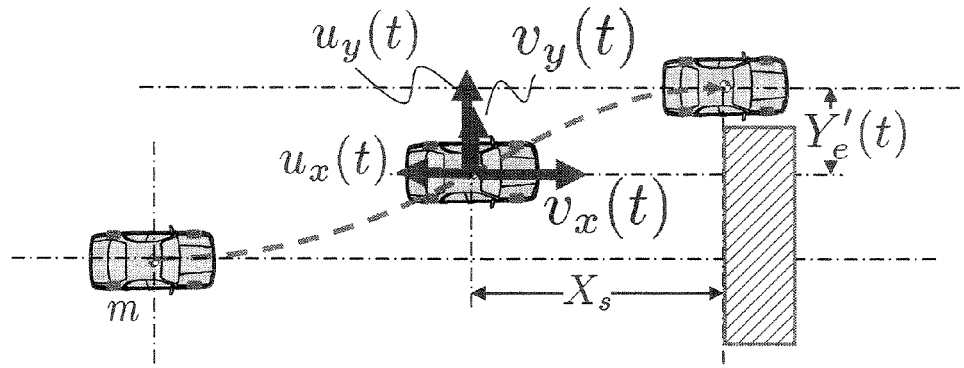
FIG. 25A is a diagram showing the exemplary embodiment of the invention.
Figure 25B:
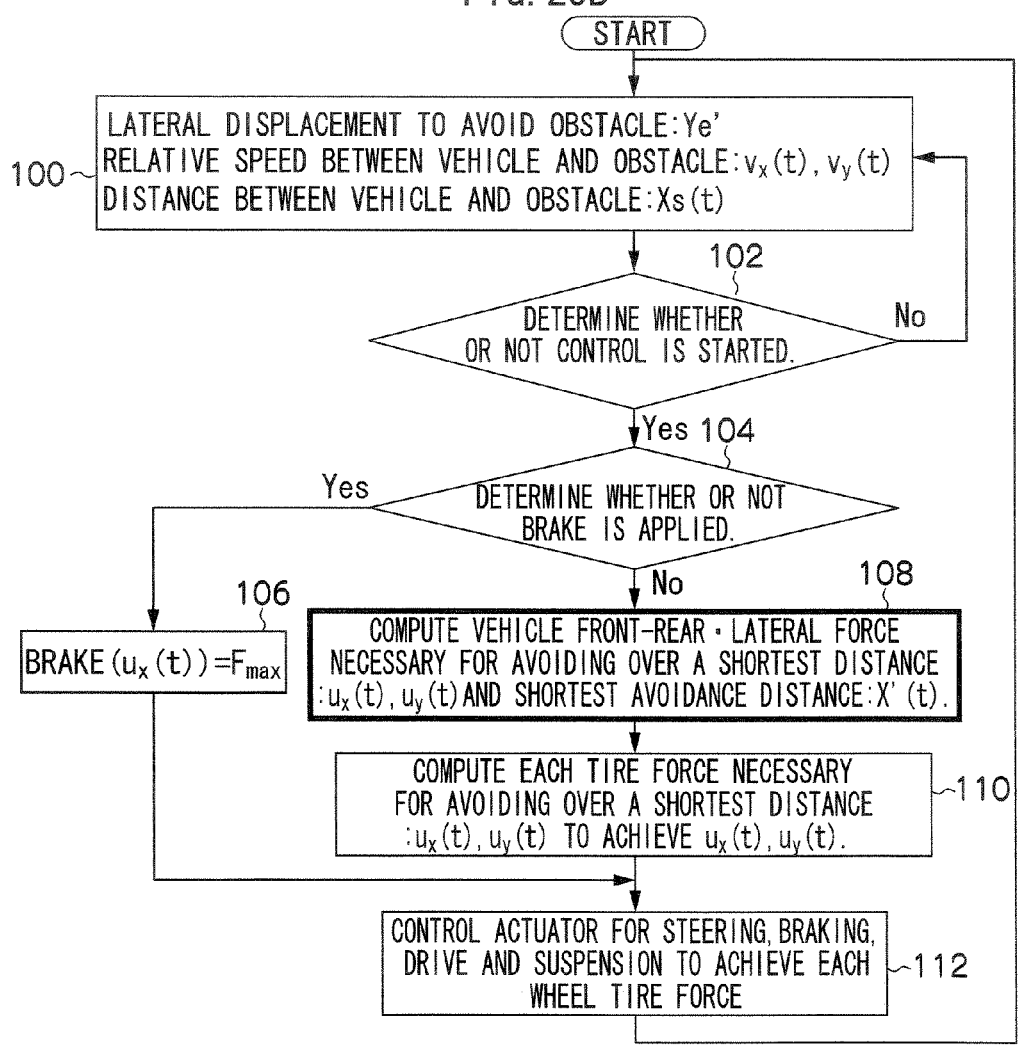
FIG. 25B is a flow chart showing an obstacle avoidance control of the exemplary embodiment of the invention.

Hereinafter, obstacle avoidance control routine to be executed in the control unit 20 will be described with reference to FIGS. 25A and B. In step 100, an obstacle avoidance time $T_e$ in the initial condition is computed based on data to be inputted by the vehicle speed sensor 10, the laser radar 18 or the like. A lateral displacement $Y_e'$ necessary for avoiding an obstacle in a current condition, relative velocities $v_x(t)$, $v(t)$ between the vehicle and the obstacle and a distance $Xs(t)$ between the vehicle and the obstacle are detected by computation or the like. In next step 102, whether or not the control should be started is determined based on the distance $Xx$ from the current vehicle and the obstacle and the initial speed. This determination is carried out based on the map indicating the relationship between the shortest avoidance distance and the initial speed as shown in FIG. 2. The shortest avoidance distance ($mv_0^2/2F_{max}$) in the straight line braking and the shortest avoidance distance ($v_0\sqrt{(mY_e/2F_{max})}$) are expressed as shown in FIG. 2. Thus, when the distance is longer by a predetermined distance a than the shorter distance of the shortest avoidance distance in the straight line braking and the shortest avoidance distance in the lateral movement, it is determined that the control is started. Thus, in an area in which the initial speed is smaller than the value ($v_0=2Y_eF_{max}/m$) of an intersection between a curve indicating the shortest avoidance distance in the straight line braking and a curve indicating the shortest avoidance distance in only the lateral movement, when the distance is longer by the predetermined distance a than the shortest avoidance distance in the straight line braking, it is determined that the control is started. In an area in which the initial speed is more than the value of the intersection, when the distance is longer by the predetermined distance a than the shortest avoidance distance in only the lateral movement, it is determined that the control is started.

If it is not determined that the control is started in step 102, the processing returns to step 100, in which detection for the lateral displacement or the like is repeated. If it is determined that the control is started in step 102, in step 104, whether or not it is a control area by the lateral brake is determined based on the map shown in FIG. 26, vehicle speed in a current condition and a detected lateral displacement. If the lateral displacement is 3 m or less while the vehicle speed is $v_x(t) \leq v_{dec}$, it is determined that it is the control area by the straight line braking. Then, the control force $u_x(t)$ which is a control input in step 106 is set to maximum braking force $F_{max}$ and the processing proceeds to step 112.

On the other hand, if it is determined that the lateral displacement is 3 m or more in step 104 or if it is determined that the area is not in a straight line braking control area because the vehicle speed exceeds $v_{dec}$ although the lateral displacement is 3 m or less, in step 108, the first parameter and the second parameter are computed as described above based on the map for computing the direction of a control input memorized in the map memory unit, the lateral displacement $Y_e'$ necessary for avoiding an obstacle detected in step 100 and a relative speed ($v_x(t)$, $v_y(t)$) between the vehicle and the obstacle, so that the front-rear direction force and lateral force ($u_x(t)$, $u_y(t)$) which are the control inputs are computed based on the first parameter and the second parameter.

In next step 110, respective wheel tire force necessary for achieving the front-rear force and lateral force ($u_x(t)$, $u_y(t)$) computed in step 108 are computed. At least one of the steering angle control unit 22, the braking force control unit 24 and the driving force control unit 26 is controlled in order to obtain respective wheel tire force computed in step 112 and an obstacle avoidance condition is displayed on the display unit 30. The system may be controlled to obtain an object vehicle resultant force by controlling the respective wheel tire force.

The obstacle avoidance condition may be displayed to the vehicle driver with the direction of the respective wheel tire force without controlling at least one of the steering angle control unit 22, the braking force control unit 24 and the driving force control unit 26 to obtain the respective wheel tire force for the vehicle driver to perform the obstacle avoidance operation manually.

When controlling the system to avoid the obstacle, it is permissible to dispatch an alarm from the alarm unit without condition and indicate an alarm by displaying that the obstacle avoidance control is being carried out. The alarm may be carried out when the vehicle driver is not performing the avoidance operation and the driver's operation does not coincide with an optimum operation or when the driver's operation does not coincide with a value computed as an optimum value in this exemplary embodiment. When the physical quantity applying unit is used, it is permissible to guide the driver's operation to a better value (value computed as an optimum value in this exemplary embodiment).

Figure 27:
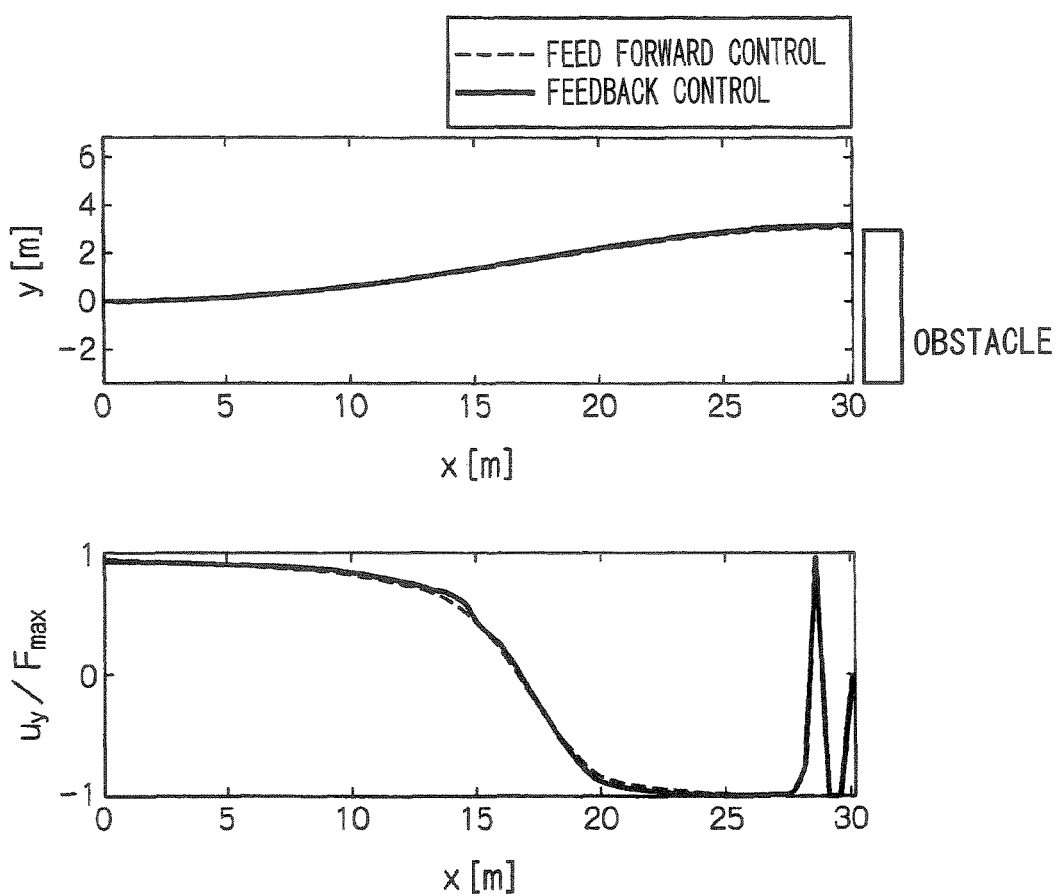
FIG. 27 is a diagram showing a result (optimum solution) by feed forward controller and a result by feed back controller of the exemplary embodiment.

Hereinafter, to verify the validity of the controller of this exemplary embodiment, FIG. 27 shows a result (optimum solution) of the feed forward controller at the time when the initial speed $v_0$ is 29 m/s and the avoidance distance $Y_e$ is 3 m, and a result by the feedback controller.

The avoidance trajectory by the feedback controller almost meets an optimum solution by the feed forward controller. If looking at the control input ($u_y$, normalized at a maximum force $F_{max}$), it is found that hunting occurs in the vicinity of termination of the avoidance. This reason is considered to be that a remaining avoidance distance and lateral speed approach 0 in the vicinity of the termination of the avoidance, particularly that a value of the parameter $v_y/\sqrt{(Y_e')}$ becomes unstable. Actually, it is a control by mainly the lateral position control to satisfy a terminating condition that the avoidance distance and lateral speed are 0 in the vicinity of the termination of the avoidance. After the avoidance distance is decreased to some extent, such hunting may be avoided by changing to a simple lateral position control.

Figure 28:
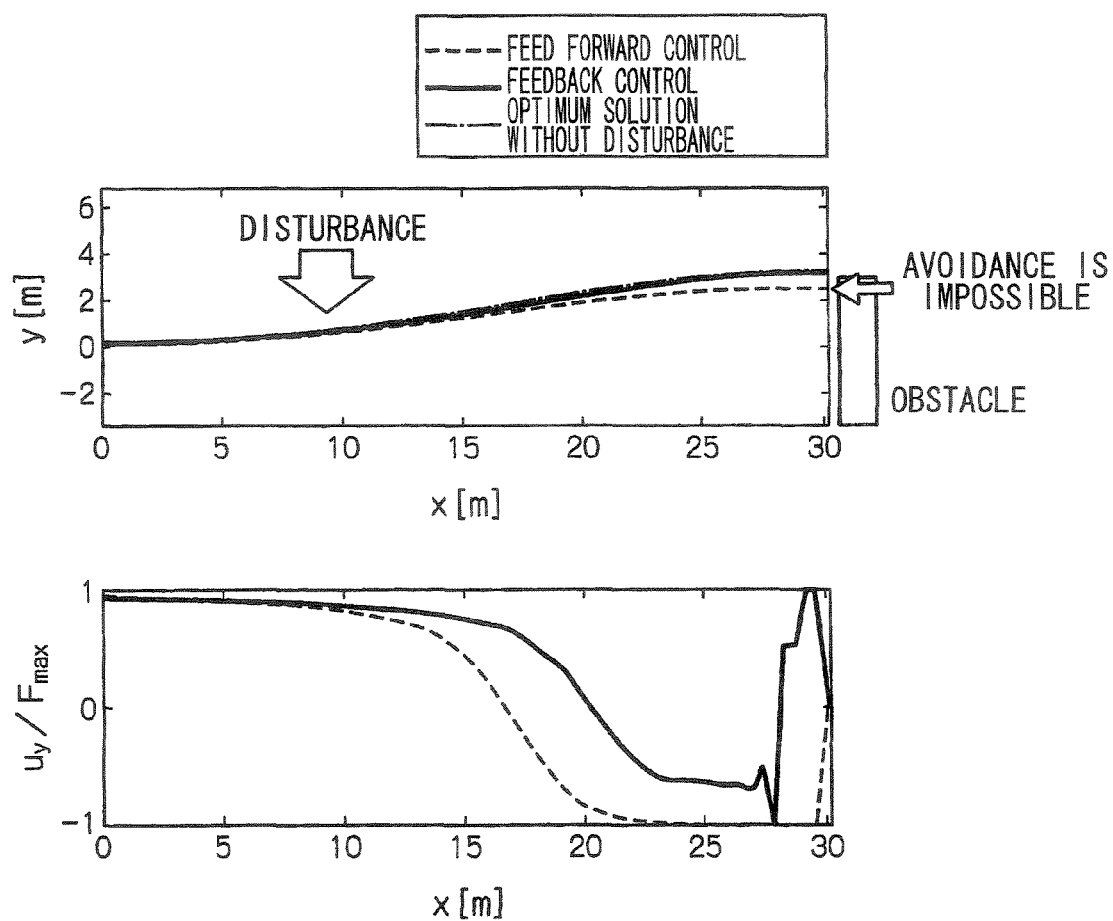
FIG. 28 is a diagram showing a result of examination about robustness to disturbance in the exemplary embodiment.

Next, robustness to disturbance will be verified. FIG. 28 shows a result of control when a disturbance of about −0.3 G is applied in the lateral direction in an interval (around a portion expressed as "disturbance" in the Figure) from 20% to 40% the avoidance time. While the avoidance distance of 3 m may not be secured by feed forward control, the avoidance distance of 3 m may be maintained by feed back control. If looking at the control input at that time, it is found that the feed back controller controls the avoidance distance by increasing $u_y$ to the feed forward controller. These results indicate a height of the robustness to disturbance of a proposed controller.

According to this exemplary embodiment described above, a feedback controller for computing the control input successively can be constructed with a simple map from a current front-rear and lateral velocities and a remaining avoidance distance by reconstructing the optimum solution obtained by off-line computation toward the emergent avoidance problem with respect to the mass point model. The controller of this exemplary embodiment operates effectively even under an existence of disturbance.

Although the control under limit travel condition has been described above, the direction and size of each wheel tire force necessary for achieving the front-rear force and the lateral force ($u_x(t)$, $u_y(t)$) under the limit travel condition.

INDUSTRIAL APPLICABILITY

The present invention may be applied to a control unit for controlling a vehicle in order to avoid an obstacle.

DESCRIPTION OF REFERENCE NUMERALS

10: vehicle speed sensor
12: steering angle sensor
14: throttle opening sensor
16: front camera
18: laser radar
20: control unit
22: steering angle control unit
24: braking force control unit
26: driving force control unit
28: map memory unit
30: display unit

The invention claimed is:

1. An obstacle avoidance control device comprising:
a detector for detecting a distance between a vehicle and an obstacle and a relative speed of the vehicle with respect to the obstacle;
a memory which stores a map for computing a vehicle resultant force for avoiding the obstacle based on a parameter specified by a physical quantity determined based on a component $v_x$ in the vehicle longitudinal direction of the relative speed, a component $v_y$ in a vehicle lateral direction of the relative speed and a vehicle lateral direction distance $Y_e'$ for avoiding the obstacle; and
a computing unit for computing the parameter based on the distance and the relative speed detected by the detector and the vehicle resultant force using the computed parameter and the map.

2. An obstacle avoidance control device comprising:
a detector for detecting a distance between a vehicle and an obstacle and a relative speed of the vehicle with respect to the obstacle;
a memory which stores a map for computing a vehicle resultant force for avoiding the obstacle based on a first parameter specified by a physical quantity determined based on a component $v_x$ in the vehicle longitudinal direction of the relative speed and a vehicle lateral direction distance $Y_e'$ for avoiding the obstacle and a second parameter specified by a physical quantity determined based on a component $v_y$ in the vehicle lateral direction of the relative speed and a vehicle lateral direction distance $Y_e'$ for avoiding the obstacle; and
a computing unit for computing the first parameter and the second parameter based on the distance detected by the detector and the relative speed and for computing the vehicle resultant force using the computed first parameter and second parameter and the map.

3. The obstacle avoidance control device of claim 1, further comprising a notifying device for notifying a vehicle driver of an obstacle avoidance condition based on the vehicle resultant force computed by the computing unit.

4. The obstacle avoidance control device of claim 1, further comprising a control unit for controlling at least one of steering angle, braking force and driving force based on the vehicle resultant force computed by the computing unit.

5. The obstacle avoidance control device of claim 2, wherein the first parameter is specified by a ratio the component $v_x$ in the vehicle longitudinal direction of the relative speed and a square root of the vehicle lateral direction distance $Y_e'$ for avoiding the obstacle or a ratio between the component $v_x$ in the vehicle longitudinal direction of the relative speed and a time $T_{min}$ required for traveling over the vehicle lateral direction distance $Y_e'$ for avoiding the obstacle, and the second parameter is specified by a ratio between the component $v_y$ in the vehicle lateral direction of the relative speed and a square root of the vehicle lateral direction distance $Y_e'$ for avoiding the obstacle or a ratio between the component $v_y$ in the vehicle lateral direction of the relative speed and the time $T_{min}$ required for traveling over the vehicle lateral direction distance $Y_e'$ for avoiding the obstacle.

6. The obstacle avoidance control device of claim 2, wherein the first parameter is specified by a ratio of square root of the vehicle lateral direction distance $Y_e'$ for avoiding the obstacle with respect to the component $v_x$ in the vehicle longitudinal direction of the relative speed, and the second parameter is specified by a ratio of the component $v_y$ in the vehicle lateral direction of the relative speed with respect to the square root of the vehicle lateral direction distance $Y_e'$ for avoiding the obstacle.

7. The obstacle avoidance control device of claim 2, wherein the map is constituted of a map which specifies a relationship among the first parameter, the second parameter and the vehicle resultant force.

8. The obstacle avoidance control device of claim 2, wherein the map comprises a first map which specifies the relationship among the first parameter, the second parameter, and a first initial parameter specified by a physical quantity determined based on an initial value $v_0$ in the vehicle longitudinal direction of the relative speed and an initial value $Y_e$ of the vehicle lateral direction distance for avoiding the obstacle, a second map which specifies a relationship of the first parameter, the second parameter, and a second initial parameter specified by a physical quantity determined based on an initial avoidance time and a current time, and a third map which specifies the relationship among the first initial parameter, the second initial parameter, and the vehicle resultant force.

9. The obstacle avoidance control device of claim 4, further comprising an alarm unit for dispatching an alarm if no control is performed by the control unit when the distance is longer by a predetermined distance than the shorter distance of the shortest avoidance distance by straight line braking and the shortest avoidance distance by pure lateral movement.

10. The obstacle avoidance control device of claim 1 or claim 2, wherein the vehicle resultant force is a direction θ of the vehicle resultant force.

11. A recording medium recording an obstacle avoidance control program which causes a computer to carry out processing comprising:
importing a distance between a vehicle and an obstacle and a relative speed of the vehicle with respect to the obstacle, which are detected by a detector for detecting the distance and the relative speed;
computing a vehicle resultant force for avoiding the obstacle based on a parameter specified by a physical quantity determined based on a component $v_x$ in the vehicle longitudinal direction of the relative speed, a component $v_y$ in the vehicle lateral direction of the relative speed, and a vehicle lateral direction distance $Y_e'$ for avoiding the obstacle; and
computing the parameter based on the distance and the relative speed detected by the detector, and using the computed parameter and the map to compute the vehicle resultant force.

12. A recording medium recording an obstacle avoidance control program which causes a computer to carry out processing comprising:
importing a distance between a vehicle and an obstacle and a relative speed of the vehicle with respect to the obstacle, which are detected by a detector for detecting the distance and the relative speed;
computing, based on the imported information, a first parameter specified by a physical quantity determined based on a component $v_x$ in the vehicle longitudinal direction of the relative speed and a vehicle lateral direction distance $Y_e'$ for avoiding the obstacle, and a second parameter specified by a physical quantity determined based a component $v_y$ in the vehicle lateral direction of the relative speed and the vehicle lateral direction distance $Y_e'$ for avoiding the obstacle;
read out a map for computing, based on the first parameter and the second parameter, a vehicle resultant force for avoiding the obstacle, from a memory in which the map is stored;
and compute the vehicle resultant force for avoiding the obstacle based on the calculated first parameter, the calculated second parameter and the read out map.

13. The recording medium recording the obstacle avoidance control program of claim 11 or claim 12 wherein the vehicle resultant force is a direction θ of the vehicle resultant force.

* * * * *